US011567451B2

(12) United States Patent
Song et al.

(10) Patent No.: US 11,567,451 B2
(45) Date of Patent: *Jan. 31, 2023

(54) HOLOGRAPHIC DISPLAY APPARATUS AND METHOD FOR PROVIDING EXPANDED VIEWING WINDOW

(71) Applicants: SAMSUNG ELECTRONICS CO., LTD., Suwon-si (KR); Korea University Research and Business Foundation, Sejong Campus, Sejong-si (KR)

(72) Inventors: Hoon Song, Yongin-si (KR); Hwi Kim, Sejong-si (KR); Jungkwuen An, Suwon-si (KR); Hongseok Lee, Seoul (KR); Yunhee Kim, Seoul (KR); Chilsung Choi, Suwon-si (KR)

(73) Assignees: SAMSUNG ELECTRONICS CO., LTD., Suwon-si (KR); Korean University Research and Business Foundation, Sejong Campus, Sejong-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/357,180

(22) Filed: Jun. 24, 2021

(65) Prior Publication Data
US 2021/0325827 A1 Oct. 21, 2021

Related U.S. Application Data

(63) Continuation of application No. 16/732,928, filed on Jan. 2, 2020, now Pat. No. 11,073,794.

(30) Foreign Application Priority Data

Jul. 25, 2019 (KR) .......................... 10-2019-0090298

(51) Int. Cl.
*G03H 1/22* (2006.01)
*G06T 3/40* (2006.01)

(52) U.S. Cl.
CPC ......... *G03H 1/2294* (2013.01); *G03H 1/2205* (2013.01); *G06T 3/4084* (2013.01);
(Continued)

(58) Field of Classification Search
CPC ............... G03H 1/2294; G03H 1/2205; G03H 2001/2239; G03H 2223/13;
(Continued)

(56) References Cited

U.S. PATENT DOCUMENTS 10,088,802 B2 10/2018 Kim et al.
2007/0109617 A1 5/2007 Cable et al.
(Continued)

FOREIGN PATENT DOCUMENTS

CN 111142352 A 5/2020
EP 3650948 A1 5/2020
(Continued)

OTHER PUBLICATIONS

An et al., "Binocular Holographic Display with Pupil Space Division Method", SID Symposium Digest of Technical Papers, 36, 1, 2015, pp. 522-525, 4 pages total.
(Continued)

*Primary Examiner* — Jitesh Patel
(74) *Attorney, Agent, or Firm* — Sughrue Mion, PLLC

(57) ABSTRACT

A holographic display apparatus capable of providing an expanded viewing window and a display method are provided. The holographic display apparatus includes an image processor configured to provide computer generated hologram (CGH) data to a spatial light modulator, wherein the image processor is further configured to generate a hologram data array comprising information of the holographic image
(Continued)

to be reproduced at the first resolution or a resolution less than the first resolution, perform an off-axis phase computation on the hologram data array at the second resolution, and then, generate the CHG data at the first resolution.

22 Claims, 16 Drawing Sheets

(52) U.S. Cl.
CPC . *G03H 2001/2239* (2013.01); *G03H 2223/13* (2013.01); *G03H 2223/15* (2013.01); *G03H 2223/19* (2013.01); *G03H 2225/12* (2013.01); *G03H 2226/02* (2013.01)

(58) Field of Classification Search
CPC ........... G03H 2223/15; G03H 2223/19; G03H 2225/12; G03H 2226/02; G03H 1/2286; G03H 2001/0224; G03H 2001/0816; G03H 2001/0825; G03H 2001/2207; G03H 2001/221; G03H 2001/2271; G03H 2210/454; G03H 2223/12; G03H 2223/17; G03H 2223/53; G03H 2225/33; G03H 2225/55; G03H 2226/05; G03H 2240/56; G03H 2240/61; G03H 2240/62; G03H 1/0808; G03H 1/0891; G03H 1/02; G03H 1/22; G03H 1/12; G03H 2223/26; G06T 3/4084; G06T 1/20; G06T 7/50
See application file for complete search history.

(56) References Cited

U.S. PATENT DOCUMENTS

| 2010/0157399 | A1* | 6/2010 | Kroll | G03H 1/02 |
| | | | | 359/11 |
| 2017/0038727 | A1* | 2/2017 | Kim | G06T 3/4007 |
| 2017/0185037 | A1* | 6/2017 | Lee | G03H 1/2294 |
| 2017/0235277 | A1* | 8/2017 | Seo | G06F 3/013 |
| | | | | 359/9 |
| 2018/0143588 | A1 | 5/2018 | Lee et al. | |
| 2020/0142355 | A1 | 5/2020 | An et al. | |

FOREIGN PATENT DOCUMENTS

| GB | 2 441 447 A | 3/2008 |
| KR | 10-2017-0016158 A | 2/2017 |
| KR | 10-2020-0052199 A | 5/2020 |
| WO | 2019/009722 A2 | 1/2019 |

OTHER PUBLICATIONS

Choi et al., "Synthetic phase holograms for auto-stereoscopic image displays using a modified IFTA", vol. 12, No. 11, Optics Express, May 31, 2004, 9 pages total.

Communication dated Jul. 16, 2020 issued by the European Intellectual Property Office in counterpart European Application No. 20158818.3.

\* cited by examiner

HOLOGRAPHIC DISPLAY APPARATUS AND METHOD FOR PROVIDING EXPANDED VIEWING WINDOW

CROSS-REFERENCE TO RELATED APPLICATIONS

This is a continuation application of U.S. application Ser. No. 16/732,928, filed Jan. 2, 2020, which claims priority from Korean Patent Application No. 10-2019-0090298, filed on Jul. 25, 2019 in the Korean Intellectual Property Office, the disclosures of which are incorporated herein by reference in their entireties.

BACKGROUND

1. Field

Apparatuses and methods consistent with example embodiments relate to holographic display apparatuses and display methods, and more particularly to, holographic display apparatuses capable of providing an expanded viewing window when reproducing a holographic image via an off-axis technique and display methods.

2. Description of the Related Art

Methods such as glasses-type methods and non-glasses-type methods are widely used for realizing 3D images. Examples of glasses-type methods include deflected glasses-type methods and shutter glasses-type methods, and examples of non-glasses-type methods include lenticular methods and parallax barrier methods. When these methods are used, there is a limit to the number of viewpoints that may be implemented due to binocular parallax. Also, these methods make the viewers feel tired due to the difference between the depth perceived by the brain and the focus of the eyes.

Recently, holographic 3D image display methods, which provide full parallax and are capable of making the depth perceived by the brain consistent with the focus of the eyes, have been gradually put to practical use. According to such a holographic display technique, when light is radiated onto a hologram pattern having recorded thereon an interference pattern obtained by interference between light and object light reflected from an original object, the light is diffracted and an image of the original object is reproduced. When a currently commercialized holographic display technique is used, a computer-generated hologram (CGH), rather than a hologram pattern obtained by directly exposing an original object to light, is provided as an electrical signal to a spatial light modulator. Then, the spatial light modulator forms a hologram pattern and diffracts light according to an input CGH signal, thereby generating a 3D image.

SUMMARY

According to an aspect of an example embodiment, there is provided a holographic display apparatus including: a spatial light modulator comprising a plurality of display pixels two-dimensionally arranged at a first resolution to display a hologram pattern for modulating the illumination light to reproduce a holographic image; a mask member disposed to face the spatial light modulator and comprising an array of a plurality of light transmission patterns irregularly arranged at a second resolution higher than the first resolution; and an image processor configured to: generate a hologram data array comprising information of the holographic image to be reproduced at the first resolution or a resolution less than the first resolution; perform an off-axis phase computation on the hologram data array at the second resolution; and generate computer generated hologram (CGH) data at the first resolution; and provide the CGH data to the spatial modulator.

The plurality of light transmission patterns of the mask member may include a plurality of openings irregularly arranged on an opaque substrate.

A size of each of the plurality of openings may be smaller than a size of one display pixel of the plurality of display pixels of the spatial light modulator.

One opening of the plurality of openings may correspond to the one display pixel of the spatial light modulator.

Relative positions between the plurality of display pixels of the spatial light modulator and the plurality of openings of the mask member respectively corresponding thereto may be irregularly set.

A relative position between a first display pixel of the spatial light modulator and a first opening of the mask member corresponding thereto and a relative position between a second display pixel of the spatial light modulator and a second opening of the mask member corresponding thereto may be different from each other.

The plurality of light transmission patterns of the mask member may include a plurality of micro lenses that are irregularly and two-dimensionally arranged.

Relative positions between the plurality of display pixels of the spatial light modulator and a center of the plurality of micro lenses of the mask member respectively corresponding thereto may be irregularly set.

A relative position between a first display pixel of the spatial light modulator and a center of a first micro lens of the mask member corresponding thereto and a relative position between a second display pixel of the spatial light modulator and a center of a second micro lens of the mask member corresponding thereto may be different from each other.

The mask member may include a phase delay plate array in which a plurality of phase delay plates having different phase delay characteristics are two-dimensionally arranged irregularly.

The spatial light modulator may include a color filter array, and the color filter array may include a plurality of first color filters that transmit only a light of a first wavelength, a plurality of second color filters that transmit only a light of a second wavelength different from the first wavelength, and a plurality of third color filters that transmit only a light of a third wavelength second different from the first and second wavelengths, and the plurality of first color filters, the plurality of second color filters, and the plurality of third color filters may be irregularly arranged in the color filter array.

Relative positions between the plurality of first color filters of the spatial light modulator and the plurality of light transmission patterns of the mask member respectively corresponding thereto may be irregularly set, relative positions between the plurality of second color filters of the spatial light modulator and the plurality of light transmission patterns of the mask member respectively corresponding thereto may be irregularly set, and relative positions between the plurality of third color filters of the spatial light modulator and the plurality of light transmission patterns of the mask member respectively corresponding thereto may be irregularly set.

The holographic display apparatus may further include an eye tracker configured to track a pupil position of an observer.

The image processor may be further configured to, to generate the hologram data array, receive image data; perform a first Fourier operation on the image data for each depth of the image data; perform a lens phase operation on the image data for each depth obtained after the first Fourier operation; merge the image data for each depth obtained after the lens phase operation into a single merged image data; and perform a second Fourier operation on the single merged image data.

The first Fourier operation may include a first inverse Fourier transform that converts a first light wavefront configured to be formed in an observer's retina into a second light wavefront configured to be formed in an observer's pupil, and the second Fourier operation comprises a second inverse Fourier transform that converts the second light wavefront into a third wavefront formed in a plane of the spatial light modulator.

The image processor may be further configured to, when performing the off-axis phase computation, generate an off-axis phase array at the second resolution; select data from the off-axis phase array based on positions of the plurality of light transmission patterns of the mask member and convert the selected data to have the first resolution; and multiply the hologram data array by the selected data having the first resolution.

The image processor may be further configured to, when performing the off-axis phase computation, upscale the hologram data array at the second resolution; multiply the off-axis phase array by the upscaled hologram data array; and select data from the hologram data array based on positions of the plurality of light transmission patterns of the mask member and convert the hologram data array into the first resolution.

The image processor may include a previously calculated phase array that was previously calculated to transmit an image displayed on positions of the plurality of light transmission patterns of the mask member to a position of an observer's eye, and the previously calculated phase array may include a plurality of phase arrays respectively corresponding to different positions of the observer's eye.

The image processor may be further configured to, when performing the off-axis phase computation, select the previously calculated phase array corresponding to the position of the observer's eye; and multiply the hologram data array by the selected previously calculated phase array.

For example, the previously calculated phase array is generated by performing a first operation of assuming that a first data array disposed on a plane of the spatial light modulator comprises uniform brightness and irregular phases; a second operation of adding characteristics of the plurality of light transmission patterns of the mask member to the first data array and then performing a Fourier operation on a pupil plane of an observer to generate a second data array; a third operation of multiplying a mask array representing the position of the observer's eye by the second data array to produce a third data array; a fourth operation of performing an inverse Fourier operation on the third data array on the plane of the spatial light modulator to produce a fourth data array; a fifth operation of adding the fourth data array and the first data array to obtain a fifth data array, and adjusting a brightness of the fifth data array such that the brightness of the fifth data array is same as a brightness of the first data array; a sixth operation of repeating operations the second to the fifth operations with respect to the fifth data array a plurality of times to generate a sixth data array; and a seventh operation of selecting data from the sixth data array based on positions of the plurality of light transmission patterns of the mask member to generate a seventh data array.

The first data array may have the second resolution or a resolution higher than the second resolution and the seventh data array has the first resolution.

According to an aspect of another example embodiment, there is provided a display method of a holographic display apparatus including an image processor, a spatial light modulator configured to form a hologram pattern for modulating an illumination light and reproducing a holographic image and including a plurality of display pixels two-dimensionally arranged at a first resolution, and a mask member disposed to face the spatial light modulator and including an array of a plurality of light transmission patterns irregularly arranged at a second resolution higher than the first resolution. The display method may include generating, by the image processor, a hologram data array including information of the holographic image to be reproduced at the first resolution or a resolution lower than the first resolution; performing, by the image processor, an off-axis phase computation on the hologram data array at the second resolution; generating, by the image processor, computer generated hologram (CGH) data at the first resolution; and providing the CGH data from the image processor to the spatial light modulator.

According to an aspect of another embodiment, a computer-readable recording medium having recorded thereon a program for executing the display method of the holographic display apparatus on a computer is provided.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
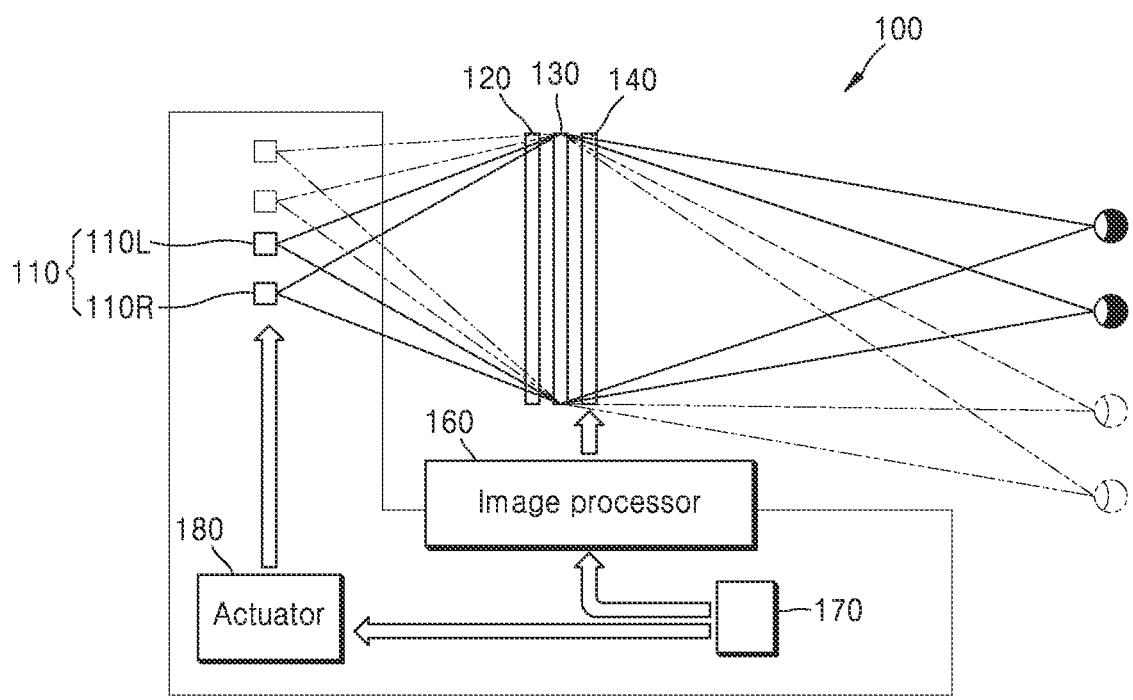
FIG. 1 is a schematic diagram showing a configuration of a holographic display apparatus according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, with reference to the accompanying drawings, a holographic display apparatus and method for providing an expanded viewing window will be described in detail. Like reference numerals refer to like elements throughout, and in the drawings, sizes of elements may be exaggerated for clarity and convenience of explanation. The example embodiments described below are merely exemplary, and various modifications may be possible from the embodiments. In a layer structure described below, an expression "above" or "on" may include not only "immediately on in a contact manner" but also "on in a non-contact manner".

FIG. 1 is a schematic diagram showing a configuration of a holographic display apparatus 100 according to an example embodiment. Referring to FIG. 1, the holographic display apparatus 100 according to an example embodiment may include a light source 110 for emitting an illumination light, a spatial light modulator 130 for displaying a hologram pattern for modulating the illumination light emitted from the light source 110 to reproduce a holographic image, a focusing optical system 120 for focusing the holographic image in a space, and a mask member 140 for expanding a viewing window by which the reproduced holographic image may be viewed. The holographic display apparatus 100 may further include an image processor 160 for generating a hologram signal according to a holographic image to be reproduced and providing the hologram signal to the spatial light modulator 130, an eye tracker 170 for tracking a pupil position of an observer, and an actuator 180 for driving the light source 110 in response to pupil position information provided by the eye tracker 170.

In FIG. 1, the focusing optical system 120, the spatial light modulator 130, and the mask member 140 are sequentially arranged along a traveling direction of an illumination light emitted from the light source 110, but this is merely an example. An arrangement order of the focusing optical system 120, the spatial light modulator 130, and the mask member 140 may be arbitrarily and differently selected. For example, the focusing optical system 120 may be disposed last on a path of the illumination light. Further, the mask member 140 may be arranged to face a light entering surface of the spatial light modulator 130 or to face a light exiting surface of the spatial light modulator 130.

The light source 110 may include a first light source 110L configured to emit a light to form a holographic image in a left eye of the observer and a second light source 110R configured to emit a light to form a holographic image in a right eye of the observer. Each of the first and second light sources 110L and 110R may be arranged to provide illumination light inclinedly or obliquely incident on the spatial light modulator 130. For example, the first light source 110L may be disposed on the opposite side of the left eye of the observer with respect to the spatial light modulator 130, and the second light source 110R may be disposed on the opposite side of the right eye of the observer with respect to the spatial light modulator 130.

The first and second light sources 110L and 110R may include laser diodes to provide illumination light having high coherence. However, when the illumination light has a certain degree of spatial coherence, since the illumination light may be sufficiently diffracted and modulated by the spatial light modulator 130, a light-emitting diode (LED) may be used as the first and second light sources 110L and 110R. In addition to the LED, any of other light sources may be used as long as light having spatial coherence is emitted. Although one first light source 110L and one second light source 110R are illustrated in FIG. 1 for convenience of description, the first and second light sources 110L and 110R may include an array of a plurality of lasers or LEDs.

The spatial light modulator 130 may form a hologram pattern for diffracting and modulating the illumination light, according to a hologram data signal, e.g. a computer-generated hologram (CGH) data signal, provided by the image processor 160. To this end, the spatial light modulator 130 may include a plurality of two-dimensionally arranged display pixels. The spatial light modulator 130 may use any one of a phase modulator for performing phase modulation, an amplitude modulator for performing amplitude modulation, and a complex modulator performing both phase modulation and amplitude modulation. Although the spatial light modulator 130 of FIG. 1 is a transmissive spatial light modulator, a reflective spatial light modulator may also be used. The transmissive spatial light modulator may use, for example, a semiconductor modulator based on a compound semiconductor such as GaAs, or a liquid crystal device (LCD). The reflective spatial light modulator may use, for example, a digital micromirror device (DMD), liquid crystal on silicon (LCoS) technology, or a semiconductor modulator.

The image processor 160 may be configured to generate a hologram signal according to a holographic image to be provided to the observer, provide the hologram signal to the spatial light modulator 130, and control an operation of the light source 110. For example, the image processor 160 may control turning on and off of the first and second light sources 110L and 110R. The image processor 160 may be implemented using software, or may be implemented in the form of a semiconductor chip in which functions of such software are embedded.

The eye tracker 170 may obtain an image of the observer through a camera or the like, detect a pupil of the observer in the image, and analyze a position of the pupil. The eye tracker 170 may track a pupil position change of the observer in real time and provide a result to the image processor 160. The image processor 160 may then generate a hologram signal in response to pupil position information of the observer provided by the eye tracker 170. For example, the image processor 160 may generate the hologram signal in accordance with a change in viewpoint according to a change in the position of the observer and may provide the generated hologram signal to the spatial light modulator 130. Also, the image processor 160 may control the actuator 180 to change positions of the first and second light sources 110L and 110R such that the illumination light proceeds toward the pupil of the observer.

The focusing optical system 120 may focus a reproduction light formed by modulating the illumination light by the spatial light modulator 130 onto a predetermined space. For example, the focusing optical system 120 may focus the reproduction light on the pupil position of the observer. The reproducing light may be focused on a space by the focusing optical system 120 such that the holographic image may be formed on the space.

Figure 2:
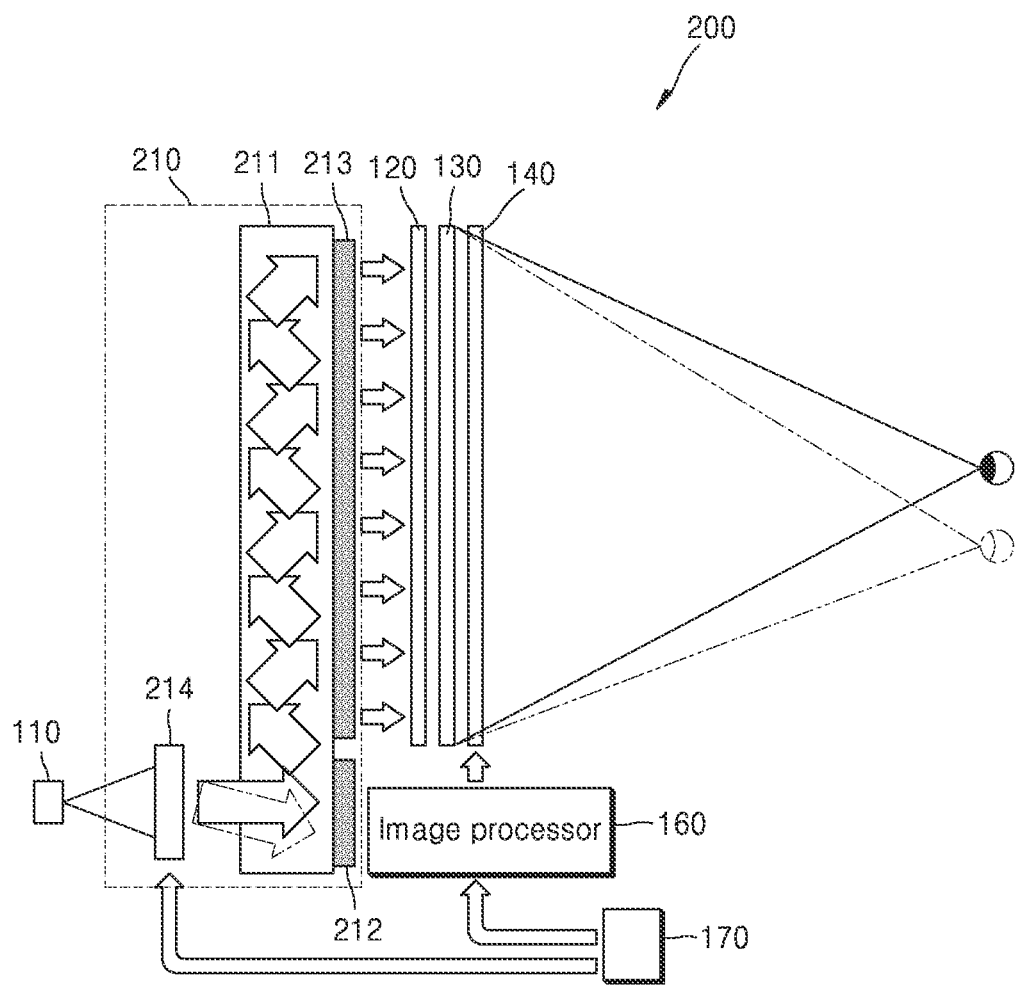
FIG. 2 is a schematic diagram showing a configuration of a holographic display apparatus according to another example embodiment.

FIG. 2 is a schematic diagram showing a configuration of a holographic display apparatus 200 according to another example embodiment. Referring to FIG. 2, the holographic display apparatus 200 according to an example embodiment may include the light source 110 for emitting illumination light, the spatial light modulator 130 for displaying a hologram pattern for modulating the illumination light emitted from the light source 110 to reproduce a holographic image, the focusing optical system 120 for focusing the holographic image on a space, the mask member 140 for expanding a viewing window by which the reproduced holographic image may be viewed, the image processor 160 for generating a hologram signal according to a holographic image to be reproduced and providing the hologram signal to the spatial light modulator 130, an illumination optical system 210 for transmitting the light emitted from the light source 110 to the spatial light modulator 130, and the eye tracker 170 for tracking a pupil position of an observer.

The holographic display apparatus 200 according to the present embodiment may use the single light source 110 for both the left eye and the right eye, instead of including two separate light sources (e.g., a first light source 110L for the left eye and a second light source 110R for the right eye). The single light source 110 may provide a holographic image for the left eye and a holographic image for the right eye by using the illumination optical system 210. To this end, the illumination optical system 210 may be configured to divide the light incident from the light source 110 and travel in a left eye direction and a right eye direction. For example, the illumination optical system 210 may include a transparent light guide plate 211 including an input coupler 212 and an output coupler 213, and a beam deflector 214 for providing the light emitted from the light source 110 to the input coupler 212.

The beam deflector 214 may be a liquid crystal deflector that diffracts incident light to produce two light beams traveling at different angles. The two light beams may be incident on the input coupler 212 at different angles and travel at different angles within the light guide plate 211. As a result, exit angles of the two light beams emitted through the output coupler 213 may also be different from each other. The two light beams from the output coupler 213 may transmit through the focusing optical system 120, the spatial light modulator 130, and the mask member 140 and then finally travel toward the left and right eyes of the observer respectively. The beam deflector 214 may also adjust incidence angles of the two light beams incident on the input coupler 212 in response to pupil position information of the observer provided from the eye tracker 170.

Figure 3:
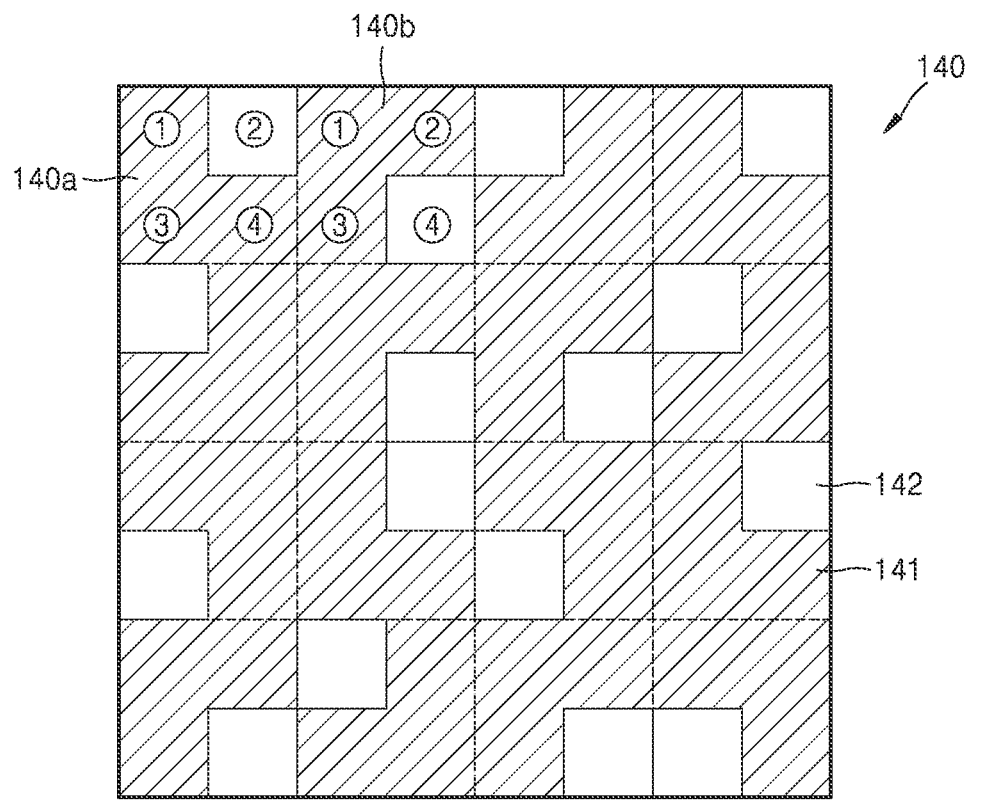
FIG. 3 illustrates an example of a configuration of a mask member according to an example embodiment.
Figure 3:
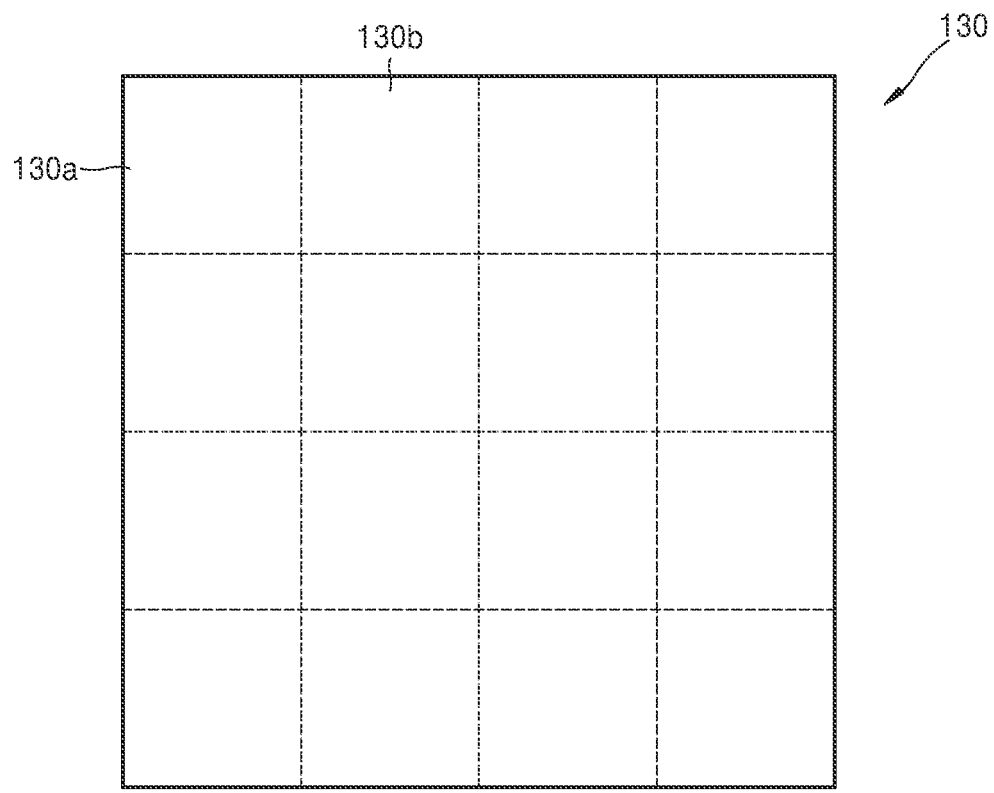

Meanwhile, the mask member 140 may include an array of a plurality of irregularly and randomly arranged light transmission patterns to expand a viewing window of the holographic display apparatuses 100 and 200 and reduce high order noise. For example, FIG. 3 illustrates an example of a configuration of the mask member 140 according to an example embodiment. Referring to FIG. 3, the mask member 140 may include an opaque substrate 141 for blocking light and a plurality of openings 142 irregularly arranged on the opaque substrate 141. The opening 142 may be formed by completely penetrating through the opaque substrate 141 and may transmit light. Accordingly, the plurality of light transmission patterns of the mask member 140 may be formed by the plurality of openings 142.

Square lattices 140a and 140b indicated by dotted lines in FIG. 3 may correspond to display pixels 130a and 130b of the spatial light modulator 130. As shown in FIG. 3, the one opening 142 may correspond to the display pixel of the spatial light modulator 130. Thus, the openings 142 of the mask member 140 may be in one to one correspondence with the display pixels of the spatial light modulator 130, and the number of the openings 142 of the mask member 140 may be approximately equal to the number of the display pixels of the spatial light modulator 130. Further, a size of the opening 142 may be smaller than a size of the corresponding display pixel of the spatial light modulator 130. In this regard, it may be seen that the array of light transmission patterns of the mask member 140 has a resolution greater than that of the spatial light modulator 130. For example, when the size of the opening 142 of the mask member 140 is about a quarter of the display pixel of the spatial light modulator 130, the resolution of the mask member 140 may be regarded as 4 times the resolution of the spatial light modulator 130. In FIG. 3, the size of the opening 142 of the mask member 140 is about a quarter of the display pixel of the spatial light modulator 130, but is not necessarily limited thereto.

According to the present example embodiment, relative positions of the plurality of openings 142 of the mask member 140 with respect to the plurality of display pixels of the spatial light modulator 130 respectively corresponding thereto may be irregularly set. Each of the openings 142 may be located in a partial region of the corresponding display pixel because the size of each of the openings 142 is less than that of the plurality of display pixels of the spatial light modulator 130. Positions of the openings 142 may be irregularly and randomly different. In other words, the relative position of any one opening 142 of the mask member 140 with respect to one corresponding display pixel of the spatial light modulator 130 may be different from the relative positions of the other openings 142 of the mask member 140 with respect to the other corresponding display pixels of the spatial light modulator 130, and a degree of difference may be irregular.

Therefore, when the mask member 140 is disposed on a light entering surface of the spatial light modulator 130, an illumination light may be incident on a plurality of partial regions smaller than the display pixel of the spatial light modulator 130. Also, when the mask member 140 is disposed on a light exiting surface of the spatial light modulator 130, only light emitted from the plurality of partial regions smaller than the display pixel of the spatial light modulator 130 may be seen. As a result, a configuration in which the spatial light modulator 130 and the mask member 140 are combined may obtain the same effect as that of displaying an image for a spatial light modulator having a resolution greater than that of the spatial light modulator 130 to turn off some of the display pixels and to display only some of the display pixels that are irregularly arranged. Generally, a size of a viewing window of the holographic display apparatus 100 increases as the resolution of the spatial light modulator 130 increases. Accordingly, an expanded viewing window that is larger than a size of a viewing window determined by the actual resolution of the spatial light modulator 130 may be provided by using the mask member 140.

When using the mask member 140 having the plurality of openings 142 described above, CGH data including information of the holographic image to be reproduced may be calculated based on the positions of the openings 142. To this end, information about the positions of the plurality of openings 142 may be stored in a memory of the image processor 160, and the CGH data may be generated based on the positions of the plurality of openings 142 and provided to the spatial light modulator 130. A process in which the image processor 160 calculates the CGH data with reference to the positions of the plurality of openings 142 will be described later.

However, because the spatial light modulator 130 is configured with an array of a plurality of display pixels, a physical array structure of the plurality of display pixels may function as a diffraction lattice. Thus, the illumination light may be diffracted and interfered with not only by the hologram pattern formed by the spatial light modulator 130 but also by regular pixel lattices configured with the array of the display pixels of the spatial light modulator 130. Also, some of the illumination light may not be diffracted by the hologram pattern, but may pass through the spatial light modulator 130 as it is. As a result, a plurality of lattice spots may appear on the focal plane (or the pupil plane) of the focusing optical system 120 on which the holographic image is converged to a point. The plurality of lattice spots may function as image noise that degrades quality of the reproduced holographic image and makes it uncomfortable to observe the holographic image. For example, a 0th order noise formed by the illumination light which is not diffracted may appear on an axis of the focusing optical system 120. Also, a high order noise of a regular lattice pattern may appear around the 0th order noise by interference between light diffracted by the regular display pixel structure of the spatial light modulator 130.

To prevent the noises from being seen by the observer, the holographic image may be reproduced via an off-axis technique such that a spot of the holographic image is reproduced while avoiding the noises. The noises are generated due to an internal structure of the spatial light modulator 130 and are unrelated to the hologram pattern, and thus positions of the noises are always fixed. However, a spot position of the holographic image is determined according to the hologram pattern, and thus the hologram pattern may be formed such that the holographic image is reproduced at a position where the noises are not present. For example, the image processor 160 may add a prism phase array or an off-axis phase array in the form of a periodic sine wave to the CGH data including the holographic image information. Then, the holographic image may be reproduced off from the optical axis of the focusing optical system 120 by a periodic prism pattern displayed in addition to the hologram pattern in the spatial light modulator 130. Therefore, the reproduced holographic image may be away from the 0th order noise.

According to the present example embodiment, the position of the reproduced holographic image may be further away from the 0th order noise by expanding the viewing window by the mask member 140. Further, according to the present example embodiment, the openings 142 of the mask member 140 are irregularly arranged, and thus a high order noise generated by the regular display pixel structure of the spatial light modulator 130 may be attenuated or removed.

Figure 4:
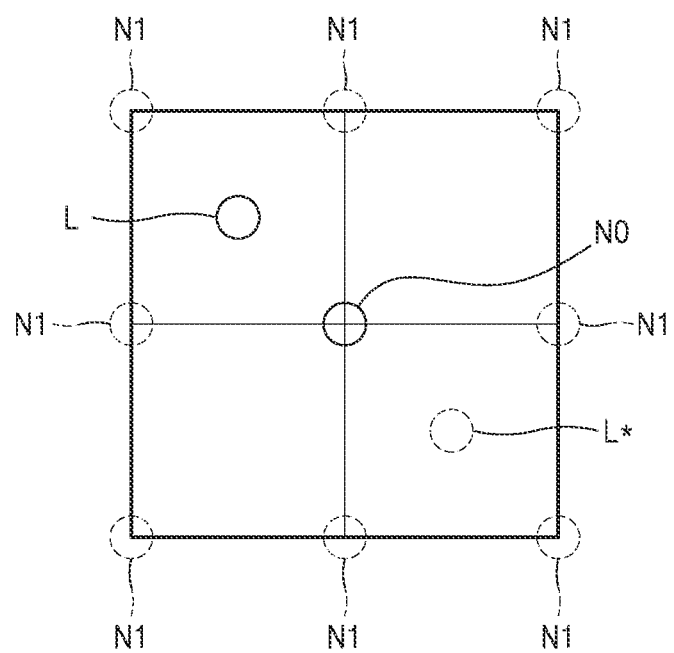
FIG. 4 illustrates an example of a distribution of light in a pupil plane of an observer's eye by a holographic display apparatus according to a comparative example that does not use a mask member.

For example, FIG. 4 illustrates an example of a distribution of light in a pupil plane of an observer's eye by a holographic display apparatus according to a comparative example that does not use the mask member 140. Referring to FIG. 4, a $0^{th}$ order noise N0 due to a 0th order diffraction may be formed on the center of the pupil plane, that is, on an optical axis. Further, around the $0^{th}$ order noise N0, higher order noises N1 generated by higher order diffraction more than $\pm 1^{st}$ order may be regularly formed in the form of a lattice. In FIG. 4, a rectangle indicated in a thick solid line surrounded by the high order noises N1 may be a viewing window determined by the resolution of the spatial light modulator 130. Although not shown in FIG. 4, the higher order noises N1 may be regularly generated outside the viewing window.

A holographic image L may be reproduced slightly away from the 0th order noise N0 using an off-axis technique. A complex conjugate image L* may be generated on the opposite side of the holographic image L with respect to the 0th order noise N0. The expression limit of an off-axis phase may be less than the pixel pitch of the spatial light modulator 130 even though the off-axis technique is used, as shown in FIG. 4, the holographic image L may not be farther away from the higher order noises N1. In other words, the holographic image L may not be reproduced beyond the viewing window determined by the resolution of the spatial light modulator 130.

Figure 5:
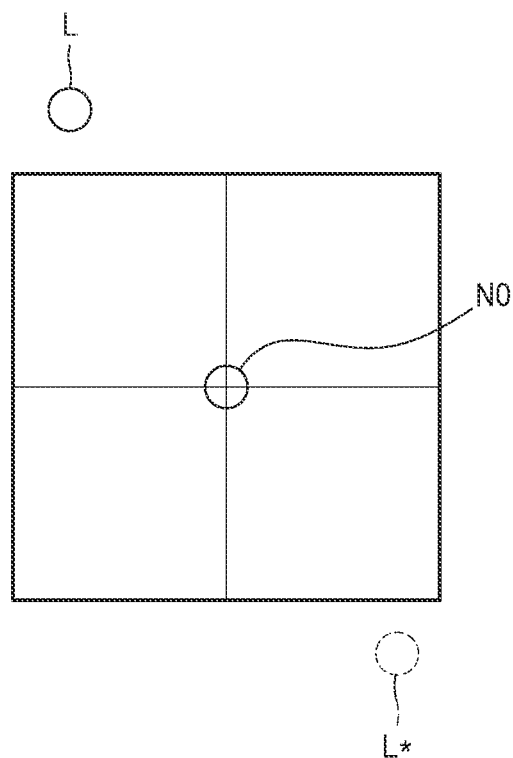
FIG. 5 illustrates an example of a distribution of light in a pupil plane of an observer's eye by holographic display apparatuses according to an example embodiment that uses the mask member.

FIG. 5 illustrates an example of a distribution of light in a pupil plane of an observer's eye by the holographic display apparatuses 100 and 200 according to an example embodiment that uses the mask member 140. Referring to FIG. 5, the $0^{th}$ order noise N0 may be formed due to a 0th order diffraction on the center of the pupil plane. However, due to an irregular arrangement of the openings 142 of the mask member 140, the higher order noises N1 generated by a high order diffraction more than $\pm 1^{st}$ order may be hardly generated. The holographic image L may be reproduced beyond the viewing window determined by the resolution of the spatial light modulator 130 due to the openings 142 of the mask member 140 having a size less than a display pixel of the spatial light modulator 130.

Therefore, the viewing window may be substantially expanded, and the holographic image L may be farther away from the 0th order noise N0, and thus the holographic image L may be viewed more comfortably. Also, when the viewing window is expanded as mentions above, even though the precision of the eye tracker 170 and the actuator 180 is reduced, it may be easy to reproduce the holographic image L in the viewing window. Therefore, the holographic image L of a low crosstalk may be reproduced without using the high-priced eye tracker 170 having high precision and the high-priced actuator 180.

In case of the mask member 140 shown in FIG. 3, one opening 142 may be disposed for each display pixel of the spatial light modulator 130. In other words, the display pixels of the spatial light modulator 130 and the openings 142 of the mask member 140 may be in one to one correspondence, but are not necessarily limited thereto. An arrangement of the openings 142 may be variously selected. For example, the opening 142 may not be disposed in some display pixels of the spatial light modulator 130, and the two openings 142 may be arranged in other display pixels. An arrangement of these openings 142 may be irregularly and randomly determined. As described above, the display pixels of the spatial light modulator 130 and the openings 142 of the mask member 140 may not be perfectly in one to one correspondence.

Further, in case of the mask member 140 shown in FIG. 3, a size of one opening 142 may be about ¼ of a size of one display pixel. Therefore, a ratio of an area of the opening 142 occupied in the total area of the mask member 140 (hereinafter, an occupancy ratio) may be 25%, but is not limited thereto. The mask member 140 of various occupancy ratios may be possible. Also, arrangement patterns of the openings 142 of the mask member 140 may be selected in various ways. A degree to which the viewing window is expanded, a degree to which the higher order noises N1 is attenuated, positions of the higher order noises N1, and the like may be different according to the occupancy ratio of the openings 142 of the mask member 140 and pattern forms in which the openings 142 are arranged.

Figure 6:
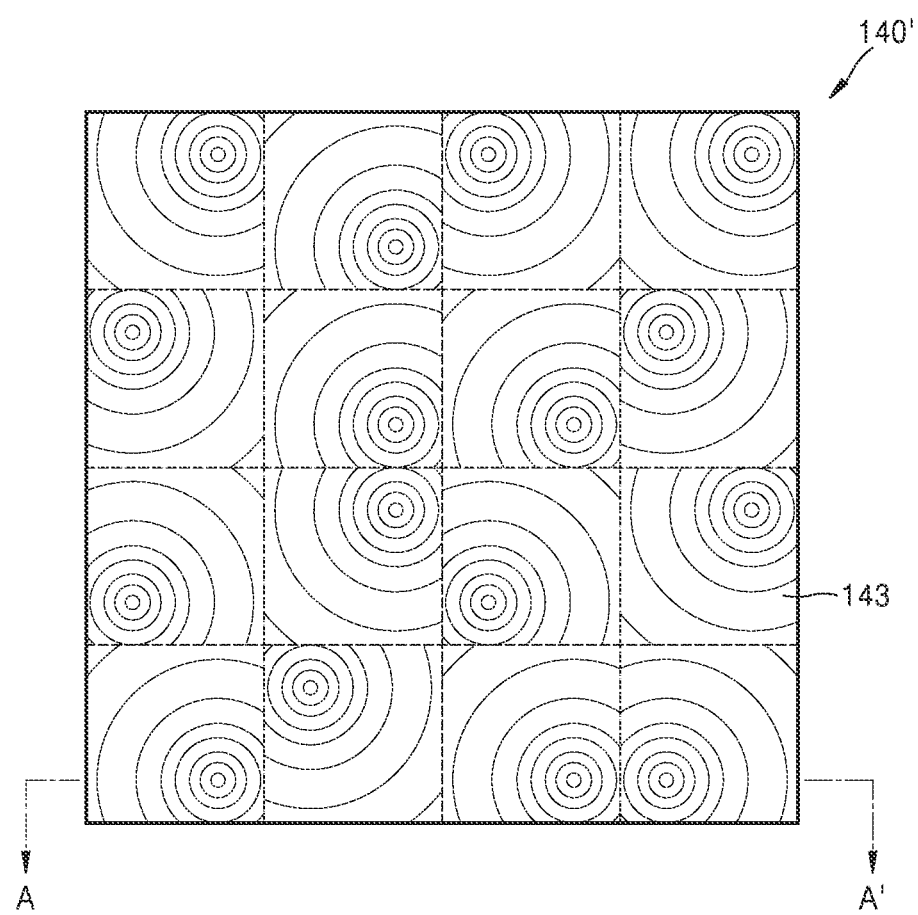
FIG. 6 shows an example of a configuration of an mask member according to another example embodiment.
Figure 7:
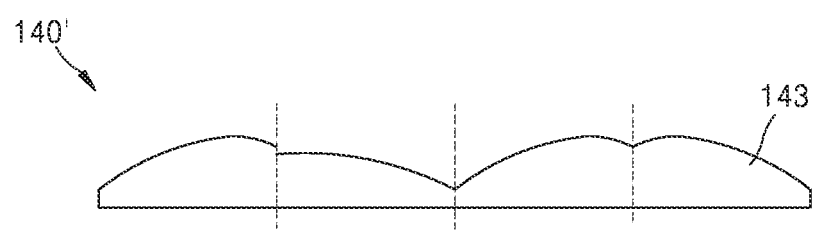
FIG. 7 shows a cross-sectional view of the mask member shown in FIG. 6 along a line A-A'.

The irregular light transmission patterns of the mask member 140 are described as the openings 142 formed through the opaque substrate 141 above. However, in case of using the opaque substrate 141 and the opening 142, because only illumination light partially transmits through the opening 142, the light utilization efficiency may be lowered. Thus, instead of the plurality of openings 142, an array of a plurality of micro lenses may be used. For example, FIG. 6 shows an example of a configuration of an mask member 140' according to another example embodiment, and FIG. 7 shows a cross-sectional view of the mask member 140' shown in FIG. 6 along a line A-A'. Referring to FIG. 6, the mask member 140' may include a plurality of micro lenses 143 that are irregularly and two-dimensionally arranged. Here, a plurality of light transmission patterns of the mask member 140' may be the plurality of micro lenses 143.

As shown in FIGS. 6 and 7, the micro lenses 143 of the mask member 140' may be in one to one correspondence with display pixels of the spatial light modulator 130, and the number of the micro lenses 143 may be the same as the number of the display pixels. According to the present example embodiment, relative positions of the plurality of micro lenses 143 of the mask member 140' with respect to the plurality of corresponding display pixels of the spatial light modulator 130 may be irregularly set. In other words, each of the micro lens 143 may have a central optical axis. A position of the central optical axis may be irregular and randomly different in each of the micro lenses 143. Therefore, a relative position of the central optical axis of one micro lens 143 of the optical element with respect to any one corresponding display pixel of the spatial light modulator 130 may be different from relative positions of the central optical axes of the other micro lenses 143 of the mask member 140' with respect to the other corresponding display pixels of the spatial light modulator 130, and a degree of difference may be irregular. As compared to the mask member 140 including the openings 142, the center optical axes of the other micro lenses 143 of the mask member 140' may be coincident with the center of the openings 142 of the mask member 140.

Each of the micro lenses 143 may be disposed only in a region of the display pixel of the corresponding spatial light modulator 130. Because positions of the center optical axes of the micro lenses 143 corresponding to the display pixels of the spatial light modulator 130 may be different with respect to each display pixel of the spatial light modulator 130, as shown in the cross-sectional view of FIG. 7, boundaries between the two adjacent micro lenses 143 corresponding to different display pixels may be discontinuous.

In addition, descriptions of the mask member 140 including the openings 142 may be most applicable to the mask member 140' including the micro lenses 143. For example, the micro lens 143 may not be disposed in some display pixels of the spatial light modulator 130, and the two micro lenses 143 may be disposed in other display pixels. Although the display pixels of the spatial light modulator 130 and the micro lenses 143 of the mask member 140' are not perfectly in one to one correspondence, the total number of the micro lenses 143 of the mask member 140' may be designed to be the same as or greater than the number of the display pixels of the spatial light modulator 130.

Figure 8:
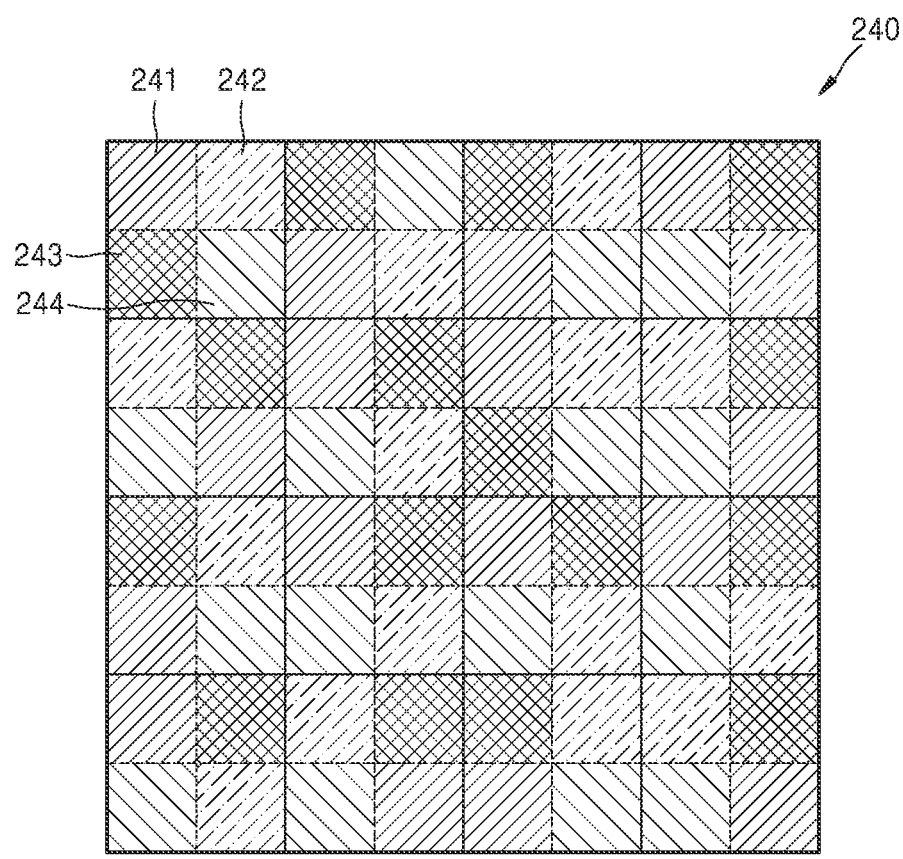
FIG. 8 illustrates an example of a configuration of a mask member according to another example embodiment.

FIG. 8 illustrates an example of a configuration of a mask member 240 according to another example embodiment. Referring to FIG. 8, the mask member 240 may include a phase delay plate array in which a plurality of phase delay plates 241, 242, 243, and 244 having different phase delay characteristics are two-dimensionally arranged irregularly. Accordingly, a plurality of light transmission patterns in the mask member 240 illustrated in FIG. 8 may be the plurality of phase delay plates 241, 242, 243, and 244. The size of each phase delay plates 241, 242, 243, and 244 in FIG. 8 may be smaller than the size of one display pixel 130a of the spatial light modulator 130 in FIG. 3. In FIG. 8, the four phase delay plates 241, 242, 243, and 244 are disposed with respect to one display pixel of the spatial light modulator 130, but are not limited thereto. For example, two, three, five or more phase delay plates may be disposed with respect to one display pixel of the spatial light modulator 130. The phase delay characteristics of the plurality of phase delay plates 241, 242, 243, and 244 may be randomly determined in random.

When the mask member 240 shown in FIG. 8 is used, light from one display pixel 130a of the spatial light modulator 130 may pass through the plurality of phase delay plates 241, 242, 243, and 244 and have different phases. Therefore, an effect of increasing the resolution of the spatial light modulator 130 may be obtained. In addition, since the phase delays caused by the phase delay plates 241, 242, 243, and 244 are irregular, the interference effect between lights having different phases may be offset and does not appear.

In the mask members 140' and 240 illustrated in FIGS. 6 to 8, light may not be blocked by the opaque substrate 141, as compared with the mask member 140 illustrated in FIG. 3. Therefore, an amount of light passing through the mask members 140' and 240 may be greater than an amount of light passing through the mask member 140, and thus the light utilization efficiency may be improved. When the mask member 140' including the plurality of micro lenses 143 or the mask member 240 including the plurality of phase delay plates 241, 242, 243, and 244 described above are used, CGH data including information of a holographic image to be reproduced may be calculated based on positions of the central optical axes of the micro lenses 143 or phase information of the plurality of phase delay plates 241, 242, 243, and 244. To this end, a memory of the image processor 160 may store the positions of the central optical axes of the micro lenses 143 or the phase information of the plurality of phase delay plates 241, 242, 243, and 244. A process in which the image processor 160 calculates the CGH data by referring to the positions of the central optical axes of the micro lenses 143 or the phase information of the plurality of phase delay plates 241, 242, 243, and 244 will be described later.

Figure 9:
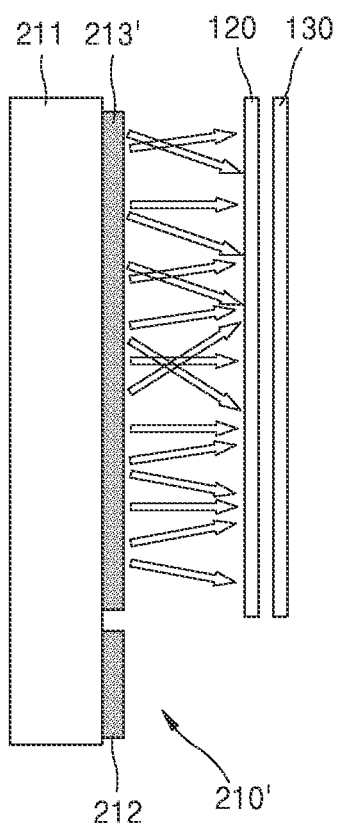
FIG. 9 is a cross-sectional view schematically showing a configuration of an illumination optical system that provides the same effect as those of the mask members shown in FIGS. 3, 6, and 8.

FIG. 9 is a cross-sectional view schematically showing a configuration of an illumination optical system 210' that provides substantially the same effect as those of the mask members 140, 140', and 240 shown in FIGS. 3, 6, and 8. Referring to FIG. 9, the configuration of the illumination optical system 210' is generally the same as the configuration of the illumination optical system 210 illustrated in FIG. 2, and only the configuration of the output coupler 213' is different. In FIG. 9, for convenience, the light source 110 and the beam deflector 214 shown in FIG. 2 are not shown. In the illumination optical system 210 illustrated in FIG. 2, light output through the output coupler 213 may be a parallel light and focused by the focusing optical system 120. In contrast, in the example embodiment shown in FIG. 9, the output coupler 213' may allow light to travel irregularly in various directions. For example, part of the light output from the output coupler 213' may be incident to the spatial light modulator 130 as the parallel light and another part of the light may be inclinedly or obliquely incident to the spatial light modulator 130. In particular, light may be incident in various directions within one display pixel of the spatial light modulator 130.

By intentionally providing irregularity to a traveling direction of the light as described above, the same effects as those of the mask members 140, 140', and 240 shown in FIGS. 3, 6 and 8 may be obtained. For example, when the parallel light is vertically incident only on a partial area of the display pixel of the spatial light modulator 130 and an oblique light is incident on the remaining area of the display pixel, the partial area where the parallel light is vertically incident may serve as the opening 142 of the mask member 140. A detailed direction distribution of the traveling direction of the light incident on the spatial light modulator 130 may be stored in the memory of the image processor 160. As described below, the image processor 160 may calculate CGH data by referring to information about the direction distribution of the light incident on the spatial light modulator 130.

Figure 10:
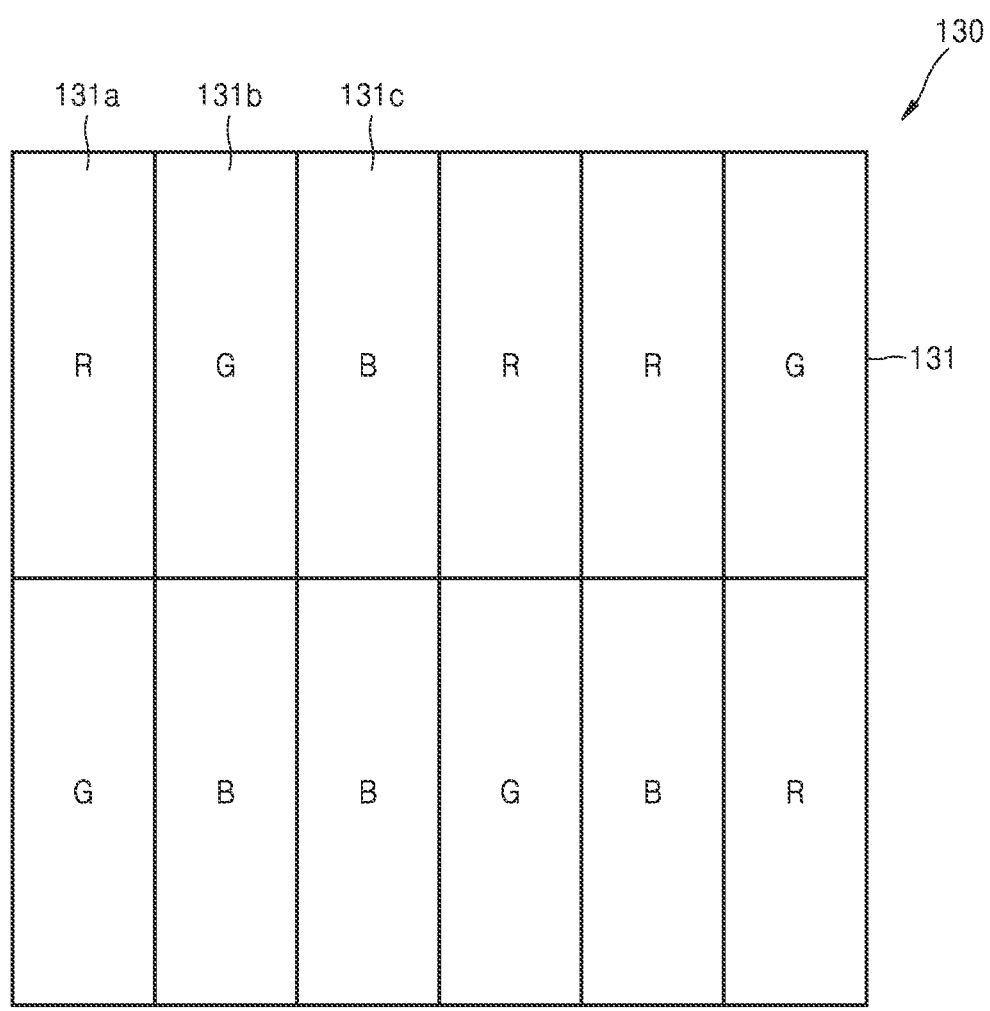
FIG. 10 illustrates an example of a color filter distribution of a color filter array of a spatial light modulator according to an example embodiment.

When the holographic display apparatuses 100 and 200 provide color holographic images, the spatial light modulator 130 may be implemented as a color display apparatus having red, green, and blue pixels. To this end, the spatial light modulator 130 may include an array of a plurality of color filters respectively corresponding to display pixels. For example, FIG. 10 illustrates an example of a color filter distribution of a color filter array 131 of the spatial light modulator 130 according to an example embodiment. Referring to FIG. 10, the color filter array 131 may include a plurality of red color filters 131a that transmit only light having a red wavelength band, a plurality of green color filters 131b that transmit only light having a green wavelength band, and a plurality of blue color filter 131c that transmit only light having a blue wavelength band. The red color filter 131a, the green color filter 131b, and the blue color filter 131c may be in one to one correspondence with the display pixels of the spatial light modulator 130.

In addition, as illustrated in FIG. 10, the plurality of red color filters 131a, the plurality of green color filters 131b, and the plurality of blue color filters 131c may be irregularly arranged. The high order noises N1 may be interference fringe patterns generated by constructive interference and extinctive interference between light having the same wavelength. When the red color filters 131a, the green color filters 131b, and the blue color filters 131c are regularly arranged, the red color filters 131a may be diffraction lattices with respect to the light of red wavelength band, the green color filters 131b may be diffraction lattices with respect to the light of green wavelength band, and the blue color filters 131c may be diffraction lattices with respect to the light of blue wavelength band. According to the present example embodiment, the plurality of red color filters 131a, the plurality of green color filters 131b, and the plurality of blue color filters 131c may be irregularly arranged, thereby suppressing light of the same wavelength from interfering with each other.

The number of red color filters 131a, green color filters 131b, and blue color filters 131c may be the same in the entire area of the spatial light modulator 130. The red color filters 131a, the green color filters 131b, and the blue color filters 131c may be distributed relatively uniformly and irregularly in the spatial light modulator 130. The image processor 160 may calculate red CGH data, green CGH data, and blue CGH data, respectively based on positions of the red color filters 131a, the green color filters 131b, and the blue color filters 131c.

Figure 11:
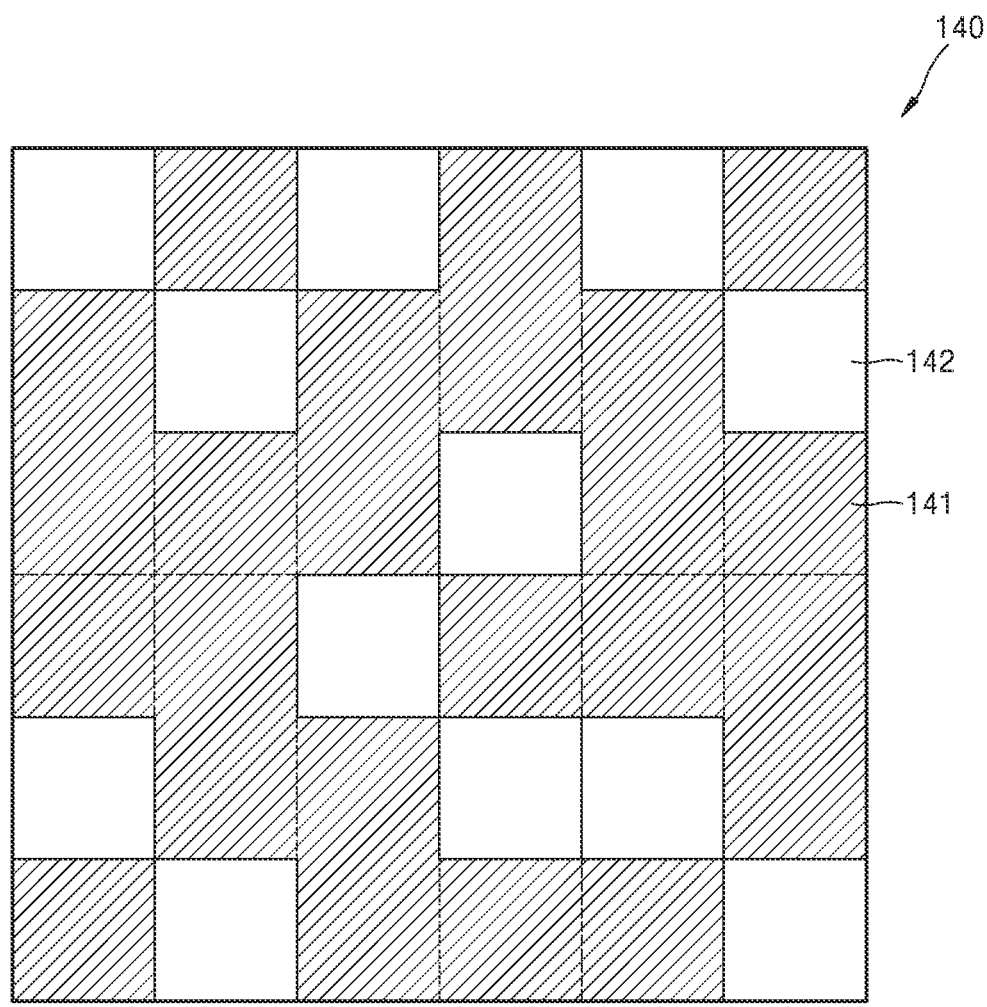
FIG. 11 illustrates an example of a configuration of a mask member according to another example embodiment.

FIG. 11 illustrates an example of a configuration of the mask member 140 according to another example embodiment. Referring to FIG. 11, the plurality of openings 142 of the mask member 140 respectively corresponding to the plurality of red color filters 131a, the green color filters 131b, and the blue color filters 131c may be irregularly arranged. Square lattices indicated by dotted lines in FIG. 11 may correspond to one display pixel or one color filter of the spatial light modulator 130. In FIG. 11, the size of each of the openings 142 is approximately ⅓ of the size of one display pixel of the spatial light modulator 130, but is not necessarily limited thereto.

The plurality of openings 142 of the mask member 140 may be irregularly arranged with respect to the entire display pixels of the spatial light modulator 130, and irregularly arranged with respect to the respective color filters. For example, the relative positions of the plurality of openings 142 with respect to the plurality of red color filters 131a respectively corresponding thereto may be irregularly set, the relative positions of the plurality of openings 142 with respect to the plurality of green color filters 131b respectively corresponding thereto may be irregularly set, and the relative positions of the plurality of openings 142 with respect to the plurality of blue color filters 131c respectively corresponding thereto may be irregularly set.

In FIG. 11, the light transmission patterns of the mask member 140 corresponding to the plurality of color filters of the spatial light modulator 130 are the openings 142, but instead of the openings 142, the micro lenses 143 or the phase delay plates 241, 242, 243 and 244 may also be used. In addition, the illumination optical system 210' shown in FIG. 9 that emits light in an irregular direction may be used.

The general operations of the holographic display apparatuses 100 and 200 described above are as follows. First, the image processor 160 may generate a hologram data signal according to a holographic image to be reproduced and provide the hologram data signal to the spatial light modulator 130. The hologram data signal may be a CGH data signal calculated to reproduce a target holographic image on a space. When the image processor 160 calculates the CGH data signal, the image processor 160 may take into account a distribution of traveling directions of light emitted from the mask members 140, 140', and 240 or the illumination optical system 210'.

The spatial light modulator 130 may display a hologram pattern on a screen of the spatial light modulator 130 according to the CGH data signal provided from the image processor 160. A principle in which the spatial light modulator 130 displays the hologram pattern may be, for example, the same as a principle in which a display panel displays an image. For example, the hologram pattern may be displayed by the spatial light modulator 130 in the form of an interference pattern including information of the holographic image to be reproduced.

At the same time, the light source 110 may provide an illumination light to the spatial light modulator 130. The illumination light incident on the spatial light modulator 130 may be diffracted and interfered by the hologram pattern displayed by the spatial light modulator 130. Thereafter, the diffracted and interfered light may be focused on a focal plane of the focusing optical system 120 and thus the holographic image having a three-dimensional effect may be reproduced on a predetermined space in front of the spatial light modulator 130. The shape and depth of the holographic image to be reproduced may be determined according to the hologram pattern displayed in the spatial light modulator 130. Here, because the resolution of the spatial light modulator 130 increases by the mask members 140, 140' and 240, a space viewed when the hologram image needs to be reproduced, that is, a view window, may be expanded.

However, as described above, because the resolution of the mask members 140, 140' and 240 is higher than the actual resolution of the spatial light modulator 130, the image processor 160 may generate CGH data based on the distribution of traveling directions of the light emitted from the mask members 140, 140', and 240 or the illumination optical system 210'. For example, FIG. 12 is a flowchart schematically illustrating an operating method performed by the holographic display apparatuses 100 and 200 according to an example embodiment related to generation of CGH data.

Figure 12:
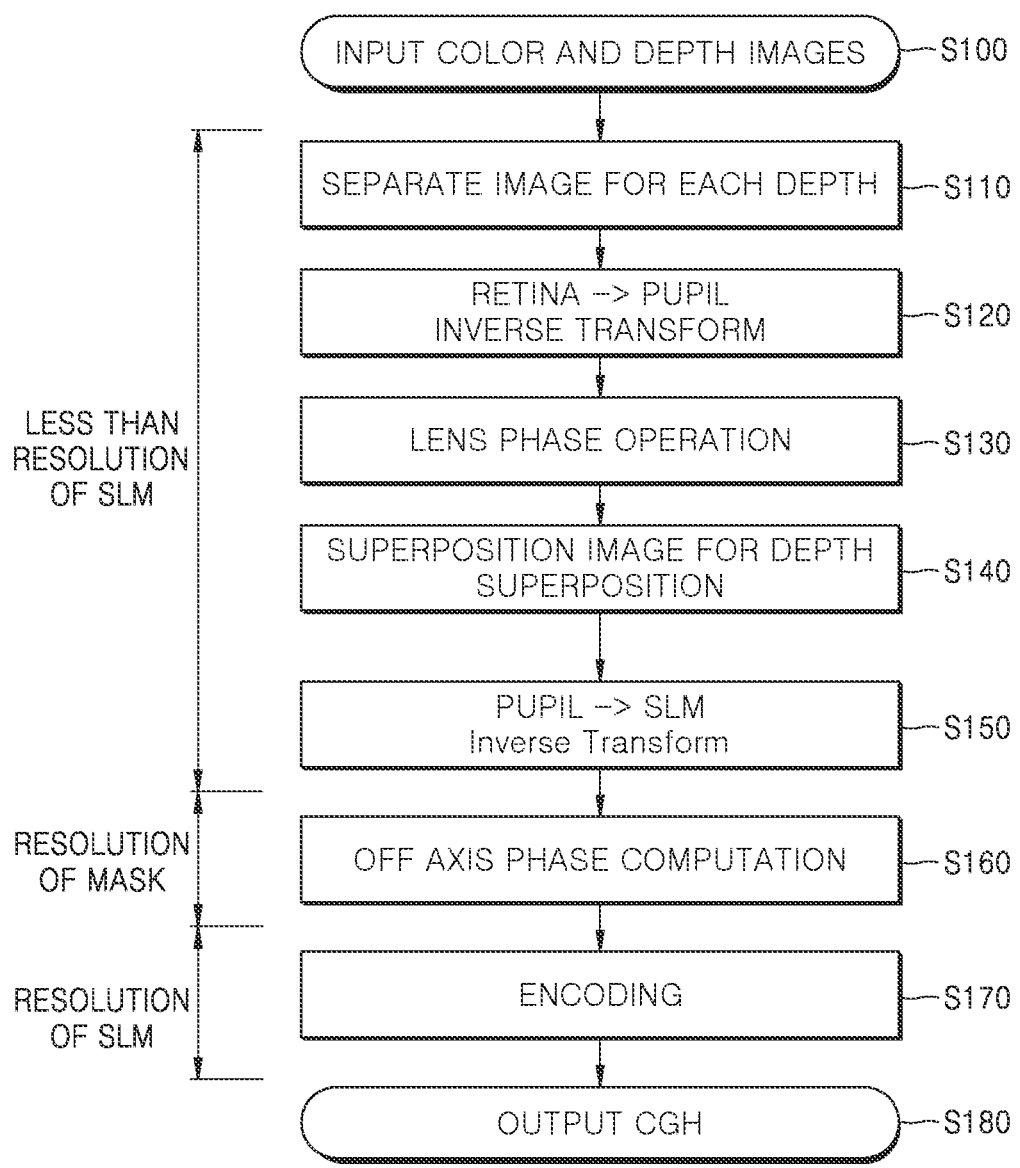
FIG. 12 is a flowchart schematically illustrating an operating method performed by a holographic display apparatus according to an example embodiment.

Referring to FIG. 12, in operation S100, the image processor 160 may receive image data. For example, when a moving image is input, the image processor 160 may receive the image data in units of frames. In other words, the image processor 160 may receive and process image data of one frame, and then receive and process image data of a subsequent frame. For example, when a layer-based algorithm is used, the image data of one frame may include color image data and depth image data. More specifically, the image data may include left eye red image data, left eye green image data, left eye blue image data, left eye depth image data, right eye red image data, right eye green image data, right eye blue image data, and right eye depth image data.

In operation S110, the image processor 160 may convert the input image data using the layer-based algorithm. The layer-based algorithm is a method of splitting a reproduction region of a hologram into a plurality of planar layers with respect to a depth and processing data of each of the split layers. The image processor 160 may separate the color image data for each layer based on depth information of the input depth image data. The number of layers to be separated may be previously determined and stored in the image processor 160.

In operation S120, the image processor 160 may perform a Fourier Transform or a Fast Fourier Transform (FFT) on the color data of each of the split planar layers. For example, the image processor 160 may perform the FFT on image data having a 2-dimensional (2D) matrix. The image processor 160 may perform 1D FFT twice to perform 2D FFT. In other words, the image processor 160 may perform the 1D FFT in row-wise on the image data and perform the 1D FFT on the converted image data in column-wise. The image processor 160 may convert the image data into complex image data having a complex value through the FFT.

A Fourier operation performed in operation S120 may be an Inverse Fourier Transform (IFT) operation or an Inverse Fast Fourier Transform (IFFT) operation from an observer's retina to an observer's pupil. In other words, a wavefront of light formed in the observer's retina may be converted into a wavefront formed in the observer's pupil through a first Fourier operation of operation S120.

Thereafter, in operation S130, the image processor 160 may perform a focus term operation or a lens phase operation using depth information of the depth image data. The lens phase operation may be to perform frequency filtering after multiplying final data obtained by performing the first Fourier operation by a depth value. For example, the depth value multiplied by the final data obtained by performing the first Fourier operation on the color image data of one layer may indicate a position of the layer in a depth direction.

Operations S120 and S130 may be performed on the image data separated for each layer in operation S110. In other words, in operations S120 and S130, the first Fourier operation and the lens phase operation may be performed on the plurality of 2D image data separated for each layer. Then, in operation S140, the image processor 160 may merge the plurality of 2D image data separated for each layer obtained by performing the lens phase operation to generate one image data having all depth information.

In operation S150, the image processor 160 may perform a second Fourier operation on one image data having all depth information. The second Fourier operation performed in operation S150 may be a second IFT operation or a second IFFT operation from the observer's pupil to a plane of the spatial light modulator 130. In other words, the wavefront of the light formed in the observer's pupil may be converted into a wavefront of light emitted from a surface of the spatial light modulator 130 through the second Fourier operation of operation S150.

In operation S160, the image processor 160 may perform prism phase computation or off-axis phase computation to adjust a position where the holographic image is reproduced. The off-axis phase computation may be to reproduce the holographic image in a space having no lattice point noise, avoiding the lattice point noise caused by a physical pixel structure of the spatial light modulator 130. To this end, the image processor 160 may multiply a 2D hologram data array obtained in operation S150 by a predetermined complex value (i.e., a prism phase array or an off-axis phase array), thereby providing a sine wave which is repeated according to a predetermined period to the 2D hologram data array obtained in operation S150. The predetermined complex value may be previously determined according to the position where the holographic image is reproduced.

In operation S170, the image processor 160 may perform pixel encoding to finally generate CGH data to be input to the spatial light modulator 130. For example, the image processor 160 may encode complex values corresponding to each of pixels of the spatial light modulator 130 to integer values in complex image data obtained in operation S160. In other words, the image processor 160 may encode the complex values of the complex image data obtained in operation S160 to n bit unsigned integer values. Here, n is a natural number. For example, when each pixel of the spatial light modulator 130 is capable of representing 256 grayscale values from 0 to 255, the image processor 160 may encode the complex values of the complex image data into 8-bit unsigned integer values.

Finally, in operation S180, the image processor 160 may output the final CGH data obtained through pixel encoding and provide the final CGH data to the spatial light modulator 130. Then, the spatial light modulator 130 may display the hologram pattern on the screen based on the CGH data received from the image processor 160.

According to the present example embodiment, in order to minimize an amount of computation in a process of generating the CGH data shown in FIG. 12, the image processor 160 may perform operations S100 to S150 at a resolution of the spatial light modulator 130 or a resolution lower than the resolution of the spatial light modulator 130, perform operation S160 at the resolution of the mask members 140, 140', and 240, and perform operations S170 and S180 at the resolution of the spatial light modulator 130. In other words, the image processor 160 may generate a hologram data array including information of the holographic image to be reproduced at the resolution of the spatial light modulator 130 or the resolution lower than the resolution of the spatial light modulator 130, perform off-axis phase computation at the resolution of the mask members 140, 140', and 240 with respect to the hologram data array, and then finally generate the CGH data at the resolution of the spatial light modulator 130. Then, the image processor 160 may greatly reduce the amount of computation of the image processor 160, compared to sampling necessary data according to the positions of the mask members 140, 140', and 240 in operation S170 after performing the process from operations S100 to S160 at the resolution of the mask members 140, 140', and 240. In this case, because the resolution of the hologram data array obtained through operations S100 to S150 and the resolution of the mask members 140, 140', and 240 are different, a process of appropriately converting the hologram data array or the off-axis phase array may be performed in operation S160 of performing the off-axis phase computation.

Figure 13:
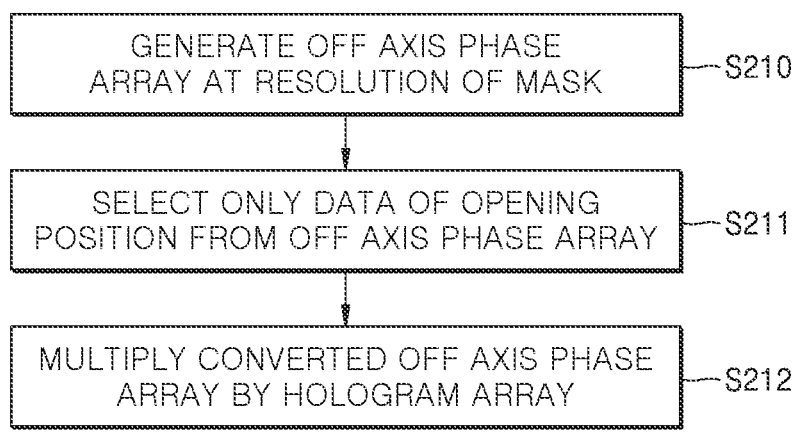
FIG. 13 is a flowchart illustrating an example of an off-axis phase computation in the operating method illustrated in FIG. 12 of the holographic display apparatus.

For example, FIG. 13 is a flowchart illustrating an example of an off-axis phase computation in the operating method illustrated in FIG. 12 of the holographic display apparatuses 100 and 200. Referring to FIG. 13, in operation S210, the image processor 160 may generate an off-axis phase array at the resolution of the mask members 140 and 140'. Complex values of the off-axis phase array may be determined according to a position where the holographic image is reproduced. For example, the image processor 160 may generate the off-axis phase array at the resolution of the mask members 140 and 140' by defining an off-axis phase function that may move the holographic image to a desired position and extracting values corresponding to all areas of the mask members 140 and 140' from the off-axis phase function.

Then, in operation S211, the image processor 160 may select only some data from the off-axis phase array based on positions of a plurality of light transmission patterns of the mask members 140 and 140' to convert a high resolution off-axis phase array to the resolution of the spatial light modulator 130. For example, when using the mask member 140 shown in FIG. 2, the image processor 160 may select only data at positions of the openings 142 from the high resolution off-axis phase array. In addition, when using the mask member 140' shown in FIG. 6, the image processor 160 may select only data at a position of the central optical axis of the micro lenses 143 from the high resolution off-axis phase array. In addition, when using the illumination optical system 210' shown in FIG. 9, the image processor 160 may select only data at positions of regions to which a parallel light is vertically incident from the high resolution off-axis phase array. Then, the high resolution off-axis phase array having the resolution of the mask members 140 and 140' may be converted into a low resolution off-axis phase array having the same resolution as that of the spatial light modulator 130.

For example, referring to FIG. 2, it is assumed that each display pixel of the spatial light modulator 130 is split into four regions indicated by ①, ②, ③, and ④ by the mask member 140. In this case, in operation S210, the image processor 160 may generate the high resolution off-axis phase array to correspond to all the regions of the mask member 140 including ①, ②, ③, and ④. Thereafter, in operation S211, the image processor 160 may select data of the off-axis phase array corresponding to a position of the region ② with respect to a first display pixel 130a disposed in the leftmost column of the uppermost row in FIG. 3 and select data of the off-axis phase array corresponding to a position of the region ④ with respect to a second display pixel 130b disposed in a left second column.

In operation S212, the image processor 160 may perform an off-axis phase computation of multiplying the selected data of the off-axis phase array converted to the low resolution by the 2D hologram data array obtained in operation S150 of FIG. 12. When operations S100 to S150 are performed at the resolution of the spatial light modulator 130, operation S212 may be performed without converting the hologram data array. However, when operations S100 to S150 are performed at the resolution lower than that of the spatial light modulator 130, the image processor 160 may first perform upscaling to convert the resolution of the 2D hologram data array obtained in operation S150 to the resolution of the spatial light modulator 130. Upscaling may use, for example, nearest interpolation, linear interpolation, bilinear interpolation, spline interpolation, etc. The image processor 160 may then multiply the hologram data array upscaled to the resolution of the spatial light modulator 130 by the off-axis phase array converted to the low resolution.

Meanwhile, a data value of the off-axis phase array may be easily defined as a simple functional equation because the data value has the form of a periodic sine wave, such as a sine wave or a sawtooth wave. Therefore, operations S210 and S211 may be performed in one operation. For example, in operation S211 described above, the image processor 160 may extract the values corresponding to all areas of the mask members 140 and 140' from the function defining the off-axis phase and generate the off-axis phase array at the resolution of the mask members 140 and 140'. However, instead, the image processor 160 may extract the value corresponding to the positions of the openings 142 of the mask members 140 and 140' or the position of the central optical axis of the micro lenses 143 from the function defining the off-axis phase to directly generate the off-axis phase array having the resolution of the spatial light modulator 130 in a single process.

Figure 14:
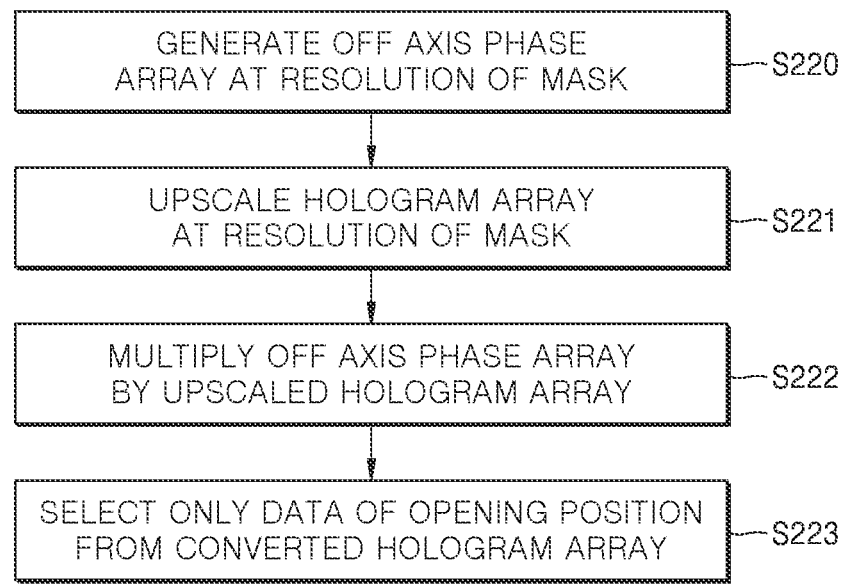
FIG. 14 is a flowchart illustrating another example of an off-axis phase computation in the operating method illustrated in FIG. 12 of the holographic display apparatus.

FIG. 14 is a flowchart illustrating another example of an off-axis phase computation in the operating method illustrated in FIG. 12 of the holographic display apparatuses 100 and 200. Referring to FIG. 14, in operation S220, the image processor 160 may generate an off-axis phase array at a resolution of the mask members 140 and 140'. Complex values of the off-axis phase array may be determined according to a position where the holographic image is reproduced. For example, the image processor 160 may generate the off-axis phase array at the resolution of the mask members 140 and 140' by defining an off-axis phase function that may move the holographic image to a desired position and extracting values corresponding to all areas of the mask members 140 and 140' from the off-axis phase function.

Thereafter, in operation S221, the image processor 160 may upscale the 2D hologram data array obtained in operation S150 of FIG. 12 to the resolution of the mask members 140 and 140'. Upscaling may use, for example, nearest interpolation, linear interpolation, bilinear interpolation, spline interpolation, etc.

Then, the off-axis phase array obtained in operation S220 and the hologram data array obtained in operation S221 have the same resolution. In operation S222, the image processor 160 may perform off-axis phase computation by multiplying a high resolution hologram data array upscaled to the resolution of the mask members 140 and 140' by the off-axis phase array.

Finally, in operation S223, the image processor 160 may convert the high resolution hologram data array converted to have the off-axis phase array to the resolution of the spatial light modulator 130. For example, when using the mask member 140 shown in FIG. 2, the image processor 160 may select only data at positions of the openings 142 from the high resolution hologram data array. In addition, when using the mask member 140' shown in FIG. 6, the image processor 160 may select only data at a position of the central optical axis of the micro lenses 143 from the high resolution hologram data array. In addition, when using the illumination optical system 210' shown in FIG. 9, the image processor 160 may select only data at positions of regions to which a parallel light is vertically incident from the high resolution hologram data array. Then, the high resolution hologram data array having the resolution of the mask members 140 and 140' may be converted into a hologram data array having the same resolution as that of the spatial light modulator 130.

In the methods illustrated in FIGS. 13 and 14, the image processor 160 may newly generate an off-axis phase array for each frame with respect to the image data input in operation S100 to perform off-axis phase computation. In addition, the image processor 160 may newly perform off-axis phase computation according to a change in the pupil position of an observer tracked by the eye tracker 170. However, because the shape of the mask members 140, 140', and 240 is already determined and the off-axis phase function is already defined, a conversion table for transmitting an image displayed on light transmission patterns of the mask members 140, 140', and 240 to a position of the observer's eye may be previously calculated and stored in a memory, and the previously calculated and stored conversion table may be applied to the 2D hologram data array obtained in operation S150, and thus the amount of computation may be further reduced.

Figure 15:
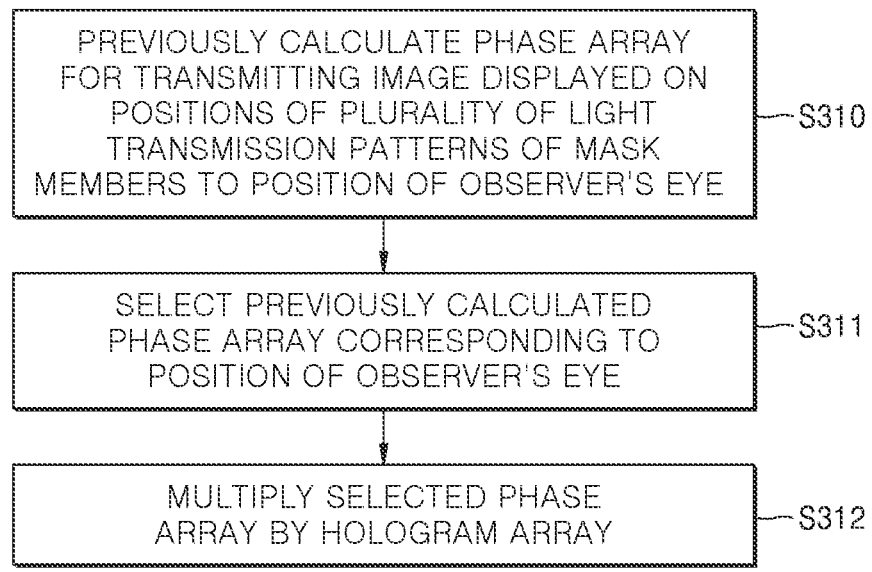
FIG. 15 is a flowchart illustrating another example of an off-axis phase computation in the operating method illustrated in FIG. 12 of the holographic display apparatus.

For example, FIG. 15 is a flowchart illustrating another example of an off-axis phase computation in the operating method illustrated in FIG. 12 of the holographic display apparatuses 100 and 200. Referring to FIG. 15, in operation S310, a phase array for transmitting an image displayed on positions of a plurality of light transmission patterns of the mask members 140, 140', and 240 to a position of an observer's eye may be previously calculated. The phase array may be calculated separately according to the position of the observer's eye. For example, when the mask member 140 shown in FIG. 2 is used, a first phase array for transmitting an image displayed on positions of the openings 142 to a first position of the observer's eye may be previously calculated and stored, and a second phase array for transmitting the image displayed on positions of the openings 142 to a second position of the observer's eye may be previously calculated and stored. In this manner, a plurality of different phase arrays may be previously calculated according to various positions of the observer's eye, and each previously calculated phase array may be stored in the image processor 160 in the form of a 2D table. The resolution of the phase array in the form of the 2D table that is previously calculated and stored in the image processor 160 may be the same as that of the spatial light modulator 130.

Then, operations S100 to S150 shown in FIG. 12 may be performed to reproduce a holographic image. In operation S311, based on position information of the observer's eye provided by the eye tracker 170, the image processor 160 may select a phase array corresponding to a current position of the observer's eye from the plurality of phase arrays that is previously calculated and stored. In operation S312, the image processor 160 may multiply the 2D hologram data array obtained in operation S150 by the selected phase array. Thereafter, pixel encoding illustrated in operation S170 of FIG. 12 may be performed on the hologram data array obtained in operation S312. Thus, the off-axis phase computation may be performed in only one calculation.

Figure 16:
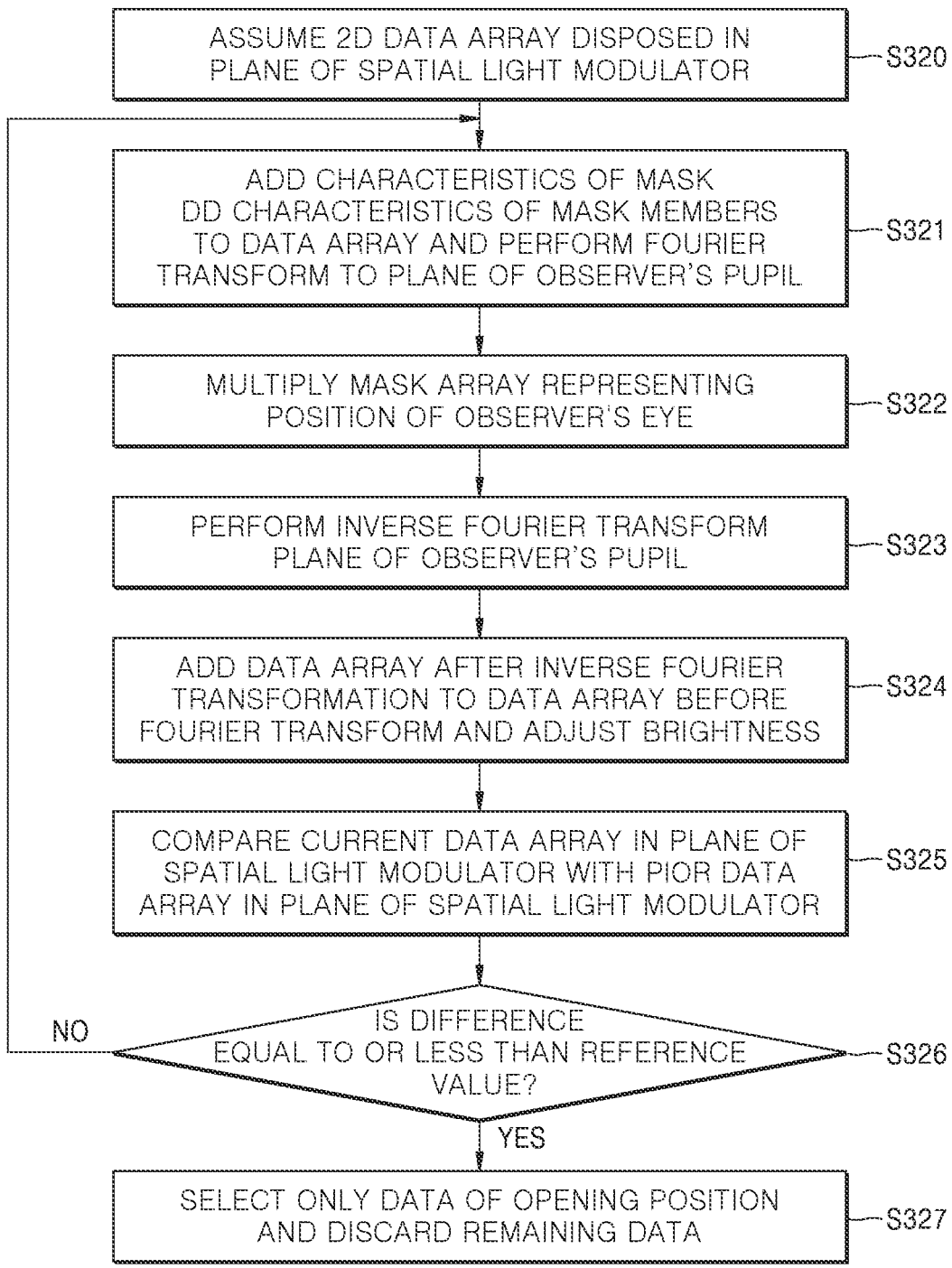
FIG. 16 is a flowchart illustrating an example of a process of calculating a phase array illustrated in FIG. 15.

In operation S310, there are various methods of previously calculating the phase array according to the position of the observer's eye based on the mask members 140, 140' and 240. For example, FIG. 16 is a flowchart illustrating an example of a process of calculating the phase array illustrated in FIG. 15. Referring to FIG. 16, first, in operation S320, a 2D data array disposed in a plane of the spatial light modulator 130 is assumed. The 2D data array is assumed to have uniform brightness and irregular phases. For example, values of the data array may be represented by a complex number, an absolute value of the complex number may be uniform, and a real part value and an imaginary part value of the complex number may be irregularly selected. In addition, the 2D data array is assumed to have a resolution of the mask members 140, 140' and 240 or a resolution higher than the resolution of the mask members 140, 140' and 240 so as to sufficiently express characteristics of the mask members 140, 140' and 240.

In operation S321, the characteristics of the mask members 140, 140', and 240 may be added to the 2D data array assumed in operation S320 above. When the mask member 140 shown in FIG. 2 is used, brightness of a part of the data array corresponding to position of the openings 142 may be maintained as it is, and brightness of a part of the data array corresponding to position of the opaque substrates 141 may change to 0. In addition, when the illumination optical system 210' shown in FIG. 9 is used, brightness of a part corresponding to position of regions where a parallel light is incident vertically may be maintained as it is and brightness of the remaining part may change to 0. In addition, when the mask member 140' shown in FIG. 6 is used, a phase change by the micro lenses 143 for each position may be added to a phase value of the corresponding position of the data array assumed in operation S320. In addition, when the mask member 240 shown in FIG. 8 is used, a phase delay by the plurality of phase delay plates 241, 242, 243, and 244 for each position may be added to the phase value of the corresponding position of the data array assumed in operation S320. The data array to which the characteristics of the mask members 140, 140' and 240 are added may be propagated onto an observer's pupil plane. For example, Fourier transform or fast Fourier transform may be performed on the observer's pupil plane with respect to the data array to which the characteristics of the mask members 140, 140' and 240 are added.

In operation S322, the mask array representing the position of the observer's eye assumed on the pupil plane may be multiplied by the Fourier transformed data array. The mask array may lighten a part of the data array corresponding to the position of the observer's eye and darken the remaining part. For example, the part of the data array corresponding to the position of the observer's eye assumed on the pupil plane may be multiplied by '1' and the remaining part by '0'.

In operation S323, the data array obtained in operation S322 may be again propagated again onto the plane of the spatial light modulator 130. For example, inverse Fourier transform or fast inverse Fourier transform may be performed on the data array obtained in operation S322 to the plane of the spatial light modulator 130.

In operation S324, the data array on which the inverse Fourier transform is performed to the plane of the spatial light modulator 130 may be added to the data array previously assumed with respect to the plane of the spatial light modulator 130. Here, the data array assumed with respect to the plane of the spatial light modulator 130 is a data array immediately before performing a Fourier operation after adding the characteristics of the mask members 140, 140' and 240 in operation S321. In this case, in order to control a speed at which final data array converges to a constant value in a subsequent repetition process, two data arrays to be added may be multiplied by a predetermined coefficient. For example, the data array on which the inverse Fourier transform is performed to the plane of the spatial light modulator 130 may be multiplied by a first coefficient, and the data array in operation S321 before the Fourier operation may be multiplied by a second coefficient. Then, the brightness of the merged and generated data array may be adjusted such that the brightness of the merged and generated data array is the same as the brightness of the data array originally assumed in operation S320. At this time, a phase of the data array may be maintained as it is. For example, an absolute value of pixel values of the data array represented by the complex number may be adjusted, but a ratio of the real part value and the imaginary part value of the complex number may be maintained.

Then, operations S321 to S324 may be repeated until a difference between the current data array on the plane of the spatial light modulator 130 and the immediately previous data array on the plane of the spatial light modulator 130 is reduced. For example, in operation S325, the data array obtained in operation S324 (i.e., the current data array on the plane of the spatial light modulator 130) and the data array before the Fourier operation in operation S321 (i.e., the immediately previous data array on the plane of the spatial light modulator 130) may be compared. In operation S326, when the difference is greater than a reference value, the process returns to operation S321. In general, operations S321 to S324 may be repeated 5 to 20 times.

When it is determined in operation S326 that the difference is less than or equal to the reference value, operation S327 may be performed. In operation S327, only some data may be selected from the data array obtained in operation S325 to obtain a final phase array. For example, when the mask member 140 shown in FIG. 2 is used, only data of the data array obtained in operation S325 corresponding to the position of the openings 142 may be obtained and the remaining data may be discarded. In addition, when the mask member 140' shown in FIG. 6 is used, only data of the data array obtained in operation S325 corresponding to the position of the micro lenses 143 may be obtained, and the remaining data may be discarded. In addition, when the mask member 240 shown in FIG. 8 is used, only data of the data array obtained in operation S325 corresponding to a specific phase delay plate may be obtained and the remaining data may be discarded. In addition, when the illumination optical system 210' shown in FIG. 9 is used, only data of the data array obtained in operation S325 corresponding to the region where the parallel light is incident vertically may be obtained and the remaining data may be discarded. Then, a resolution of the final phase array may be the same as the resolution of the spatial light modulator 130. The final phased array thus obtained may be stored in a memory of the image processor 160.

The method shown in FIG. 16 may be performed a plurality of times while varying the position of the observer's eye assumed in operation S322. Then, a plurality of phase arrays each calculated with respect to various positions of the observer's eye may be obtained. The plurality of phase arrays thus obtained may be stored in the memory of the image processor 160. As described above, the image processor 160 may select a phase array corresponding to a current position of the observer's eye based on the position information of the observer's eye provided by the eye tracker 170 from the plurality of phase arrays stored in the memory.

While the holographic display apparatuses and methods for providing an expanded viewing window have been shown and described with reference to the example embodiments illustrated in the drawings, it will be understood by those of ordinary skill in the art that various changes in form and details may be made therein without departing from the spirit and scope as defined by the following claims. It should be understood that example embodiments described herein should be considered in a descriptive sense only and not for purposes of limitation. Descriptions of features or aspects within each embodiment should typically be considered as available for other similar features or aspects in other example embodiments.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses.

Also, the description of the exemplary embodiments is intended to be illustrative, and not to limit the scope of the claims, and many alternatives, modifications, and variations will be apparent to those skilled in the art.

What is claimed is:

1. A holographic display apparatus comprising:

a light source configured to emit an illumination light;

a spatial light modulator comprising a plurality of display pixels two-dimensionally arranged at a first resolution to display a hologram pattern for modulating the illumination light to reproduce a holographic image;

an illumination optical system configured to provide the illumination light to the spatial light modulator such that the illumination light is incident on the spatial light modulator in irregular directions; and an image processor configured to:

generate a hologram data array comprising information of the holographic image to be reproduced at the first resolution or a resolution less than the first resolution;

perform an off-axis phase computation on the hologram data array at a second resolution higher than the first resolution; and generate computer generated hologram (CGH) data at the first resolution; and provide the CGH data to the spatial modulator.

2. The holographic display apparatus of claim 1, wherein the illumination optical system comprises a transparent light guide plate and an output coupler disposed on the transparent light guide plate, the output coupler being configured to allow the illumination light to travel irregularly in a plurality of different directions within each display pixel of the plurality of display pixels.

3. The holographic display apparatus of claim 2, wherein the output coupler is configured such that a first portion of the illumination light output from the output coupler is incident on the spatial light modulator as a parallel light and a second portion of the illumination light is obliquely incident on the spatial light modulator.

4. The holographic display apparatus of claim 3, wherein the first portion of the illumination light is vertically incident on a first area of each display pixel of the plurality of display pixels and the second portion of the illumination light is incident on a second area of each display pixel of the plurality of display pixels.

5. The holographic display apparatus of claim 4, wherein the image processor comprises a memory configured to store a direction distribution of a traveling direction of the illumination light incident on the spatial light modulator.

6. The holographic display apparatus of claim 4, wherein the image processor is further configured to, when performing the off-axis phase computation, generate an off-axis phase array at the second resolution;

select data from the off-axis phase array based on positions of the first areas of the plurality of display pixels and convert the selected data to have the first resolution; and multiply the hologram data array by the selected data having the first resolution.

7. The holographic display apparatus of claim 4, wherein the image processor is further configured to, when performing the off-axis phase computation, generate an off-axis phase array at the second resolution;

upscale the hologram data array at the second resolution;

multiply the off-axis phase array by the upscaled hologram data array; and select data from the hologram data array based on positions of the first areas of the plurality of display pixels and convert the hologram data array into the first resolution.

8. The holographic display apparatus of claim 4, wherein the image processor comprises a previously calculated phase array that was previously calculated to transmit an image displayed on positions of the first areas of the plurality of display pixels to a position of an observer's eye, and wherein the previously calculated phase array comprises a plurality of phase arrays respectively corresponding to different positions of the observer's eye.

9. The holographic display apparatus of claim 8, wherein the image processor is further configured to, when performing the off-axis phase computation, select the previously calculated phase array corresponding to the position of the observer's eye; and multiply the hologram data array by the selected previously calculated phase array.

10. The holographic display apparatus of claim 1, wherein the image processor is further configured to:

in order to generate the hologram data array, receive image data;

perform a first Fourier operation on the image data for each depth of the image data;

perform a lens phase operation on the image data for each depth obtained after the first Fourier operation;

merge the image data for each depth obtained after the lens phase operation into a single merged image data; and perform a second Fourier operation on the single merged image data.

11. The holographic display apparatus of claim 10, wherein the first Fourier operation comprises a first inverse Fourier transform that converts a first light wavefront configured to be formed in an observer's retina into a second light wavefront configured to be formed in an observer's pupil, and the second Fourier operation comprises a second inverse Fourier transform that converts the second light wavefront into a third wavefront formed in a plane of the spatial light modulator.

12. A display method performed by a holographic display apparatus comprising an image processor, a spatial light modulator configured to form a hologram pattern for modulating an incident light and reproducing a holographic image and comprising a plurality of display pixels two-dimensionally arranged at a first resolution, and an illumination optical system configured to provide an illumination light to the spatial light modulator such that the illumination light is incident on the spatial light modulator in irregular directions, the display method comprising:

generating, by the image processor, a hologram data array comprising information of the holographic image to be reproduced at the first resolution or a resolution less than the first resolution;

performing, by the image processor, an off-axis phase computation on the hologram data array at a second resolution higher than the first resolution;

generating, by the image processor, computer generated hologram (CGH) data at the first resolution; and providing the CGH data from the image processor to the spatial light modulator.

13. The display method of claim 12, wherein the illumination optical system comprises a transparent light guide plate and an output coupler disposed on the transparent light guide plate, the output coupler being configured to allow the illumination light to travel irregularly in various directions within each display pixel of the plurality of display pixel.

14. The display method of claim 13, wherein the output coupler is configured such that a first portion of the illumination light output from the output coupler is incident on the spatial light modulator as a parallel light and a second portion of the illumination light is obliquely incident on the spatial light modulator.

15. The display method of claim 14, wherein the first portion of the illumination light is vertically incident on a first area of each display pixel of the plurality of display pixels and the second portion of the illumination light is incident on a second area of each display pixel of the plurality of display pixels.

16. The display method of claim 15, wherein the performing the off-axis phase computation comprises:
generating an off-axis phase array at the second resolution;
selecting data from the off-axis phase array based on positions of the first areas of the plurality of display pixels and converting the selected data to have the first resolution; and
multiplying the hologram data array by the selected data having the first resolution.

17. The display method of claim 15, wherein the performing of the off-axis phase computation comprises:
generating an off-axis phase array at the second resolution;
upscaling the hologram data array at the second resolution;
multiplying the off-axis phase array by the upscaled hologram data array; and selecting data from the hologram data array based positions of the first areas of the plurality of display pixels and converting the hologram data array into the first resolution.

18. The display method of claim 15, wherein the image processor comprises a previously calculated phase array that was previously calculated to transmit an image displayed at positions of the first areas of the plurality of display pixels to a position of an observer's eye, and
wherein the previously calculated phase array comprises a plurality of phase arrays respectively corresponding to different positions of the observer's eye.

19. The display method of claim 18, wherein the performing the off-axis phase computation comprises:
selecting the previously calculated phase array corresponding to the position of the observer's eye; and
multiplying the hologram data array by the selected previously calculated phase array.

20. The display method of claim 12, wherein the generating of the hologram data array comprises:
receiving image data;
performing a first Fourier operation on the image data for each depth of the image data;
performing a lens phase operation on the image data for each depth obtained after the first Fourier operation;
merging the image data for each depth obtained after the lens phase operation into a single merged image data; and
performing a second Fourier operation on the single merged image data.

21. The display method of claim 20, wherein the first Fourier operation comprises a first inverse Fourier transform that converts a first light wavefront configured to be formed in an observer's retina into a second light wavefront configured to be formed in an observer's pupil, and the second Fourier operation comprises a second inverse Fourier transform that converts the second light wavefront into a third wavefront formed in a plane of the spatial light modulator.

22. A non-transitory computer-readable storage medium storing a program that is executable by a computer to perform the display method of claim 12.

* * * * *